United States Patent
Reitman et al.

(10) Patent No.: US 12,307,171 B2
(45) Date of Patent: *May 20, 2025

(54) METHODS AND SYSTEM FOR INCREMENTAL EXPLORATION OF DESIGN CHANGES IN LARGE COMPUTER-AIDED DESIGN MODELS

(71) Applicant: PTC INC., Boston, MA (US)

(72) Inventors: Michael A. Reitman, Zikhron Yacove (IL); Leonid Ryvchin, Haifa (IL); Moshe Jacob Baum, Carlisle, MA (US); Ivan Baltaga, Haifa (IL); Sergey Gurin, Haifa (IL)

( * ) Notice: Subject to any disclaimer, the term of this patent is extended or adjusted under 35 U.S.C. 154(b) by 58 days.

This patent is subject to a terminal disclaimer.

(21) Appl. No.: 17/752,770

(22) Filed: May 24, 2022

(65) Prior Publication Data

US 2022/0284138 A1 Sep. 8, 2022

Related U.S. Application Data

(63) Continuation of application No. 14/298,627, filed on Jun. 6, 2014, now Pat. No. 11,341,288.

(51) Int. Cl.
  *G06F 30/17* (2020.01)
  *G06F 30/00* (2020.01)
  (Continued)

(52) U.S. Cl.
  CPC .............. *G06F 30/17* (2020.01); *G06F 30/00* (2020.01); *G06F 30/15* (2020.01); *G06F 2111/02* (2020.01)

(58) Field of Classification Search
  None
  See application file for complete search history.

(56) References Cited

U.S. PATENT DOCUMENTS 4,809,170 A 2/1989 Leblang et al.
5,347,653 A 9/1994 Flynn et al.
(Continued)

OTHER PUBLICATIONS

"Revert." Merriam-Webster.com Dictionary, Merriam-Webster, https://www.merriam-webster.com/dictionary/revert. Accessed Jan. 31, 2024. p. 1 (Year: 2024).*

(Continued)

*Primary Examiner* — Akash Saxena
(74) *Attorney, Agent, or Firm* — Outside General Counsel LLP; Alexander Franco

(57) ABSTRACT

Example embodiments provide methods, mediums, and systems for making and evaluating changes to a model. According to example embodiments, checkpoints may be created as a user changes components in the model. The checkpoints may store changed components in the model that have been changed since a previous checkpoint, and a reference (e.g., a pointer) to the previous checkpoint. A user may freely create new checkpoints, revert to previous checkpoints, and select a checkpointed version of the model to be used as an official working version of the model. Upon activating an existing checkpoint, parametric relationships in the model assembly may be automatically updated in order to make components in the model consistent with each other. Thus, the user can readily change the model and evaluate variations of a design, while at the same time saving storage space by avoiding the need to repeatedly save different versions of the model.

20 Claims, 15 Drawing Sheets

*Checkpoint Data Structure*

(51) Int. Cl.
*G06F 30/15* (2020.01)
*G06F 111/02* (2020.01)

(56) References Cited

U.S. PATENT DOCUMENTS

| | | | |
|---|---|---|---|
| 5,815,154 A * | 9/1998 | Hirschtick | G06T 17/10 715/835 |
| 6,341,291 B1 | 1/2002 | Bentley et al. | |
| 6,426,750 B1 * | 7/2002 | Hoppe | G06T 17/20 345/475 |
| 6,446,057 B1 * | 9/2002 | Vaughan | G06N 5/01 706/46 |
| 6,795,966 B1 * | 9/2004 | Lim | G06F 11/1438 718/1 |
| 6,892,320 B1 * | 5/2005 | Roush | G06F 11/1433 707/999.203 |
| 7,216,254 B1 * | 5/2007 | Rajan | G06F 11/1435 714/E11.136 |
| 7,383,272 B2 | 6/2008 | Krishnan et al. | |
| 7,593,958 B2 | 9/2009 | Bergstraesser et al. | |
| 8,510,087 B2 * | 8/2013 | Mattson | G06F 30/17 703/6 |
| 8,654,145 B2 * | 2/2014 | Kasprzak | G06F 30/17 345/619 |
| 11,341,288 B2 * | 5/2022 | Reitman | G06F 30/00 |
| 2004/0010786 A1 | 1/2004 | Cool et al. | |
| 2006/0168565 A1 | 7/2006 | Gamma et al. | |
| 2006/0174190 A1 | 8/2006 | Gomes et al. | |
| 2007/0074204 A1 | 3/2007 | Curtis et al. | |
| 2012/0084060 A1 | 4/2012 | Gunasena et al. | |
| 2012/0110595 A1 * | 5/2012 | Reitman | G06F 30/00 719/313 |
| 2013/0080478 A1 | 3/2013 | Ben-Haim et al. | |
| 2015/0356207 A1 | 12/2015 | Reitman et al. | |
| 2016/0246899 A1 * | 8/2016 | Hirschtick | G06F 30/00 |
| 2022/0156427 A1 * | 5/2022 | Senoo | G06F 30/20 |

OTHER PUBLICATIONS

"International Preliminary Report on Patentability, PCT/US2015/034692, dated Dec. 13, 2016, pp. 1-21.", Dec. 13, 2016, 21 Pages, Present in parent U.S. Appl. No. 14/298,627.

"International Search Report and Written Opinion, PCT/US2015/034692, dated Mar. 2, 2016, pp. 1-12", Mar. 2, 2016, 12 Pages, Present in parent U.S. Appl. No. 14/298,627.

"Wikipedia definition showing windows registry with tree view which can be user edited (pp. 1-19) Printed Mar. 30, 2019 (Year: 2019)" Present in parent U.S. Appl. No. 14/298,627.

"Written Opinion of the Preliminary Examing Authority, PCT/US2015/034692, dated Aug. 1, 2016, pp. 1-8.", Aug. 1, 2016, 8 Pages, Present in parent U.S. Appl. No. 14/298,627.

Finkelstein, ""How to undo almost anything in AutoCAO"", AutoCAO Tips Blog, Jan. 27, 2013, pp. 1-4, URL: http://www.ellenfinkelstein.com/acadblog/how-to-undo-almost-anything-inautocad/, Jan. 27, 2013, 4 Pages, Present in parent U.S. Appl. No. 14/298,627.

Korth, H., et al., ""A concurrency control scheme for CAD transactions," University of Austin Texas, TR-85-34, pp. 1-17, (1985)", Retrieved from the Internet:URL:http://citeseerx.ist.psu.edu/viewdoc/download?Joi=10.1.1.18.7196&rep=rep1&type=pdf [retrieved on Feb. 15, 2016], Mar. 24, 2016, Present in parent U.S. Appl. No. 14/298,627.

Miles, J.C, et al., ""Versioning and configuration management in design using CAD and complex wrapped objects," Artificial Intelligence in Engineering, Elsevier Applied Science, LTD.", vol. 14(3), pp. 249-260 (2000), Mar. 24, 2016, Present in parent U.S. Appl. No. 14/298,627.

* cited by examiner

Example – Initial Config

Example – Change to Arms

Example – Adding Checkpoint

*Example – New Checkpoint Shown*

Example – Change to Wheels and New Checkpoint

Example – Activating Previous Checkpoint

Example – Branch from Previous Checkpoint (Larger Base)

System Overview

*Change Database*

*Creating a Checkpoint Flowchart*

*Checkpoint Data Structure*

Restoring from a Checkpoint Flowchart

METHODS AND SYSTEM FOR INCREMENTAL EXPLORATION OF DESIGN CHANGES IN LARGE COMPUTER-AIDED DESIGN MODELS

RELATED APPLICATIONS

The subject matter of this application is related to U.S. Application No. 14/298,627, filed Jun. 6, 2014, now U.S. Pat. No. 11,341,288, which is hereby incorporated by reference in its entirety.

BACKGROUND OF THE INVENTION

Component-based modeling environments are modeling environments which may be used to build high-level models made up of one or more elements referred to as "components" or "component models." The component models may represent unitary bodies that may be combined to form a high-level model. Component-based modeling may be used to design, model, test, and/or visualize a product. Examples of component-based modeling environments include computer-aided design (CAD) and computer-aided manufacturing (CAM) environments.

Component models may be standalone components that do not include separate internal components, or component models may be made up of one or more components. Different high-level models may use the same components, and a single high-level model may use different components to represent different versions of a single part. Each component may be stored as a separate file on a storage device.

Conventionally, changing a component in a model design in order to explore new ideas or design variations may be a technical challenge, especially when developing complex systems with many interdependent components. For example, changing the model design may involve manually backing up existing component model files to one or more folders, opening and closing multiple sessions, and manually revisiting and evaluating different model iterations. This process may be quite cumbersome and difficult for a user to manage. This process may also result in wasted storage space and processing resources, as minor modifications to a model might necessitate that each component model file associated with the model be saved and that each component of the model be rebuilt in order to implement a design change.

Moreover, after making a change to one component, other related components in an assembly may also need to be updated in order to remain consistent with the remainder of the assembly. For example, if a user is building a model of a car and the user changes the width of the car's chassis, the length of the car's axle may also need to be changed in order to be consistent with the revised assembly. Such a non-explicit change to a dependent component model may be referred to as a derived change.

Upon making explicit changes to one or more components of a model, it may be necessary to update the entire model in order to propagate derived changes to other components. One of the challenges of model design is to manage and control incremental design changes and exploration (i.e., attempting certain modifications, updating the design, and rolling back some of modifications that caused undesirable derived changes). It may be very difficult to track exactly which derived changes are caused by which explicit changes, which components were modified at each incremental modification. This challenge may make it extremely difficult to cleanly return a model to a previous state.

SUMMARY OF THE INVENTION

The present application discusses methods, mediums, and systems for making and evaluating model changes in an efficient, simple, and user-friendly manner. According to example embodiments, checkpoints may be created as a user changes the model. The changes may be made in a special type of editing session referred to as a "design session," which may include multiple models. Each checkpoint may store changes to the model that have been made since a previous checkpoint, and a reference (e.g., a pointer) to the previous checkpoint. The checkpoint may also include a path (e.g., on a local or remote storage device) to unmodified component models so that the components of the model which have not been modified since the previous checkpoint do not need to be duplicated.

A user may freely create new checkpoints, revert to previous checkpoints, split a series of checkpoints into alternative sequences, and select a checkpointed version of the model to be used as an official working version of the model. Thus, the user can readily change the model and evaluate variations or different potential evolutions of a design, while at the same time saving storage space by avoiding the need to repeatedly save different versions of the model.

According to an example embodiment, a request to create a checkpoint for a design session may be received. As noted above, a design session may include one or more models. A previous state of the model(s) in the design session may be identified, and a list of changes made to the model(s) since the previous saved state may be retrieved. A checkpoint may be created, where the checkpoint includes a reference to the previous saved state of the model(s) and a list of component models changed since the previous saved state. The reference to the previous saved state of the model may be, for example, a pointer to a second checkpoint and/or pointers to unchanged component models.

The list of changed component models may include component models affected by explicit changes and derived changes. In some embodiments, an instruction to change a first component model of the model may be received. The model may be modified based on the instruction to result in an explicit change to the model. A derived change to a second component model of the model may be identified. The derived change may be derived from the explicit change and may result, not from any user instruction to change the second component model, but may instead result (for example) from a parametric relationship between the first component model and the second component model.

In one embodiment, the checkpoint may be created in a design session. Upon entry into the design session, one or more base models may be identified. The base models may be unmodified models that will be edited during the design session. An entry checkpoint including the base models may be created. Subsequent checkpoints may be created and stored in a tree structure, where the entry checkpoint represents a root of the tree structure.

The base models and the checkpoint(s) may be stored in a design file on a first computer. The design file may be distributed to a second computer, and may be opened on the second computer and used to create a model consistent with the checkpoint.

According to further example embodiments, a model may be restored to a state consistent with a saved checkpoint. For example, a request to revert a model to a saved state may be received. A checkpoint associated with the saved state may be retrieved, where the checkpoint includes a reference to a prior checkpoint and/or unmodified component models and a list of component models that have been changed since the prior checkpoint. The prior checkpoint may be processed to retrieve a prior version of the model, and the component models in the list of changed component models may be applied to the prior version to revert the model to the requested saved state.

The prior checkpoint may be, for example, an entry checkpoint associated with a base model, where the base model is used as the prior version of the model. Alternatively or in addition, the prior checkpoint may include a reference to second prior checkpoint and a list of component models that were changed in the model between the prior checkpoint and the second prior checkpoint. In general, reverting the model to the saved state may involve retrieving a base model associated with an entry checkpoint, and retrieving a series of one or more checkpoints between the entry checkpoint and the checkpoint associated with the saved state. The series of checkpoints may include a set of one or more changed component models. The changed component models may be applied to the base model to revert the model to the saved state.

In some embodiments, reverting the model to the saved state may involve replacing only those component models that have been changed since the prior checkpoint, while preserving any component models that have not been changed since the prior checkpoint. Accordingly, storage space and processing resources may be conserved.

The list of changed component models may include component models that have been changed by an explicit change according to an express instruction to change the component model, and a derived change made to the model and/or a component of the model as a result of the explicit change in order to satisfy one or more parametric constraints on the model.

In further embodiments, a model in a first state may be provided, where the model has a first component. One or more changes to the first state of the model may be tracked. For example, an instruction to cause an explicit change to the first component may be identified, and the changed component logged in a list of changed components. An associated component that is associated with the first component may be identified based on a derived change to the associated component. The derived change may be caused by the explicit change. The associated component modified by the derived change may be logged in the list of changed components. The list of changed components may be used to create a checkpoint.

The associated component may be identified in a variety of ways. For example, the associated component may be identified by examining parametric constraints associated with the model. Alternatively or in addition, the first component may be analyzed for connections to other components, and the connected other components may be treated as associated components.

Once identified, the identity of the associated component may be stored with the list of changed components. The first components may also be stored with a list of associated components that are related to the first component by parametric relationships.

The example embodiments will be described in more detail with respect to the Figures discussed below.

DETAILED DESCRIPTION

Figure 1A:
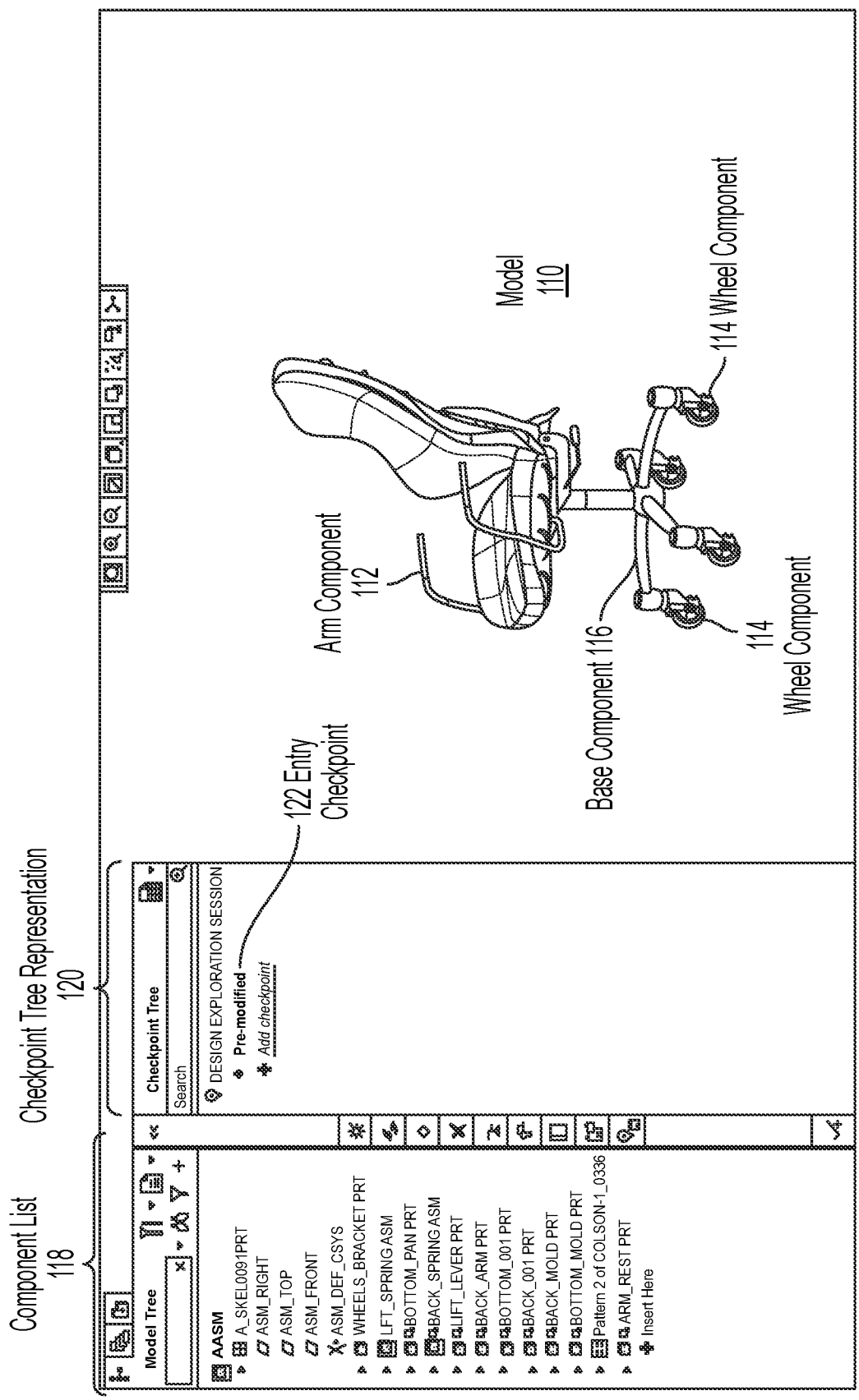
FIGS. 1A-1G depict an example of checkpointing in a component-based modeling environment.

For ease of discussion, throughout the Specification specific examples may be given with reference to the Creo® family of products from PTC®, of Needham, Massachusetts. One of ordinary skill in the art will recognize that the example embodiments described herein are not limited to a particular family of products, but rather can be applied in any suitable component-based modeling environment. It is furthermore noted that, although the present application discusses a model made up of component models, the present invention is not so limited. For example, a user may manipulate and create checkpoints for a model that does not itself contain component models.

In a component-based modeling environment, a user may construct a model by defining the geometry of the model. The geometry that makes up the model may be composed of set of surfaces, which may be bounded by edges that meet at vertices.

A geometry may represent a component of a model, which can take a wide variety of shapes or sizes. A connected collection of surfaces, edges, and vertices may define a component in the model, which can be considered as a standalone element from which a component-based model may be built. A component may be a separable part of a model that is stored in a file on a storage medium and is able to participate in a given high-level model. A collection of connected components may be referred to as an assembly.

In addition to a geometry, a component may also be associated with one or more parameters and one or more relations, such as mathematical functions. The parameters and relations may define a geometry or a relationship of dimensions and geometries. A component may be defined with respect to two-dimensional space, three-dimensional space, or both.

Component-based modeling environments generally provide tools for manipulating the geometry of a component. Examples of tools include an extrude tool, which moves a surface or a portion of a surface in two dimensional or three dimensional space, and a stretch tool, which moves selected edges and vertices in a specified direction to grow or shrink a surface or an entire component.

A user may instruct the modeling environment to make a change to a component (e.g., by applying one of the tools, or a sequence of tools and/or actions). Such a change is referred to herein as an explicit change. An explicit change may also trigger a derived change in another component of the model that is related to the changed component by a parametric relationship. A parametric relationship may be a relationship between two or more components based on one or more parameters associated with those components. A parametric relationship may arise as a result of connecting two or more components, or may be defined (manually or automatically) by a parametric constraint. A parametric constraint may define bounds for a parameter of a second component with respect to a parameter of a first component. For example, a user may define a parametric constraint for a chair model which states that the width of the base component of the chair must be a certain percentage or ratio (e.g., 95%), or within a certain range of percentages or ratios, of the seat component of the chair.

Manipulating the geometry of the component may result in one or more changes (either explicit changes or derived changes) to the component. A user may wish to evaluate multiple different design variations for a particular component or components before committing to using a particular variation in the model. For example, the user may wish to make an explicit change to a component of the model and determine whether the explicit change would result in undesirable derived changes. Furthermore, the user may wish to save the different variations or versions, including variations or versions that were rejected from consideration, in order to re-evaluate the variations or versions in the future.

Accordingly, example embodiments described herein allow checkpoints to be created. The checkpoints may capture the different design variations/versions in an efficient manner, allowing the different design variations/versions to be quickly and easily restored without the need to resort to manually saving the entire assembly of components into a new file for each variation/version to be evaluated.

The checkpoints may be created during a session of the component-based modeling environment. A session may represent a period of time over which models may be manipulated. Multiple models saved to multiple files may be manipulated in a single session, and multiple different sessions may be active at once. A session may be started and/or ended manually by a user, by instructing the modeling environment to start/end a session. Alternatively or in addition, a session may be started or ended automatically upon the occurrence of certain conditions (e.g., launching or closing a component-based modeling environment)

In some example embodiments described herein, a special type of session referred to as a design session may be started and ended. The design session may represent a period of time over which the model may be changed in a variety of ways, and the changes may be checkpointed to create different versions of components of the model. One or more of the checkpoints may be selected as the official version(s) of the model design, and may be incorporated into the model in a general session. The different versions may be saved in a design session file, which may be shared between users on the same or different computers to allow the different versions to be considered and evaluated by a design team.

The checkpoints created in the design session may contain or point to modified models (e.g., different versions or variations experimented upon during the design session). In some embodiments, the modified models may only be found within the design session (for example, the modified models and design session information may be saved into a special design session file or a temporary runtime extracted folder).

It is understood that checkpointing need not necessarily take place in a designated design session, and rather may be generally applicable to component-based modeling environments. Furthermore, for ease of discussion, examples are described below with respect to a single model being edited in a design session. However, the present invention is not limited to using a single model in the design session, and one of ordinary skill in the art will understand that multiple models may be represented in a single design session.

The use of checkpointing in a component-based modeling environment will be more clearly understood with reference to a non-limiting example. FIGS. 1A-1G depict an example of checkpointing in use in such an environment.

As shown in FIG. 1A, a model 110 may be created in a modeling environment. The model 110 may be a physical model made up of a variety of components. In the example of FIG. 1A, the model 110 represents a chair having two arm components 112, four wheel components 114, and a base component 116, among other components.

The modeling environment may also include a component list 118 allowing components to be selected, viewed, imported, replaced, or deleted in the model 110. The modeling environment may also support a checkpoint tree representation 120 that displays the checkpoints created in the current session.

The checkpoint tree representation 120 may include a hierarchy of checkpoints. The checkpoints may be stored in a database in a hierarchical manner. The checkpoint tree representation 120 may display the checkpoints from the database as a flat timeline (potentially with visual distinguishing features, such as different colors, to represent different sequences of checkpoints), or as a tree, among other possibilities. If the checkpoints are displayed as a tree, the tree may be organized as a hierarchy of checkpoint sequences or branches, where split points may become expandable nodes. Branches may be rotatable to be shown as the main branch and/or listed vertically to save graphical space.

The checkpoint tree representation 120 may include an entry checkpoint 122 representing an initial configuration of the model 110. For example, the entry checkpoint 122 may represent the state of the model at the time the current session was begun. This initial state of the model may be referred to as a base model.

Figure 1B:
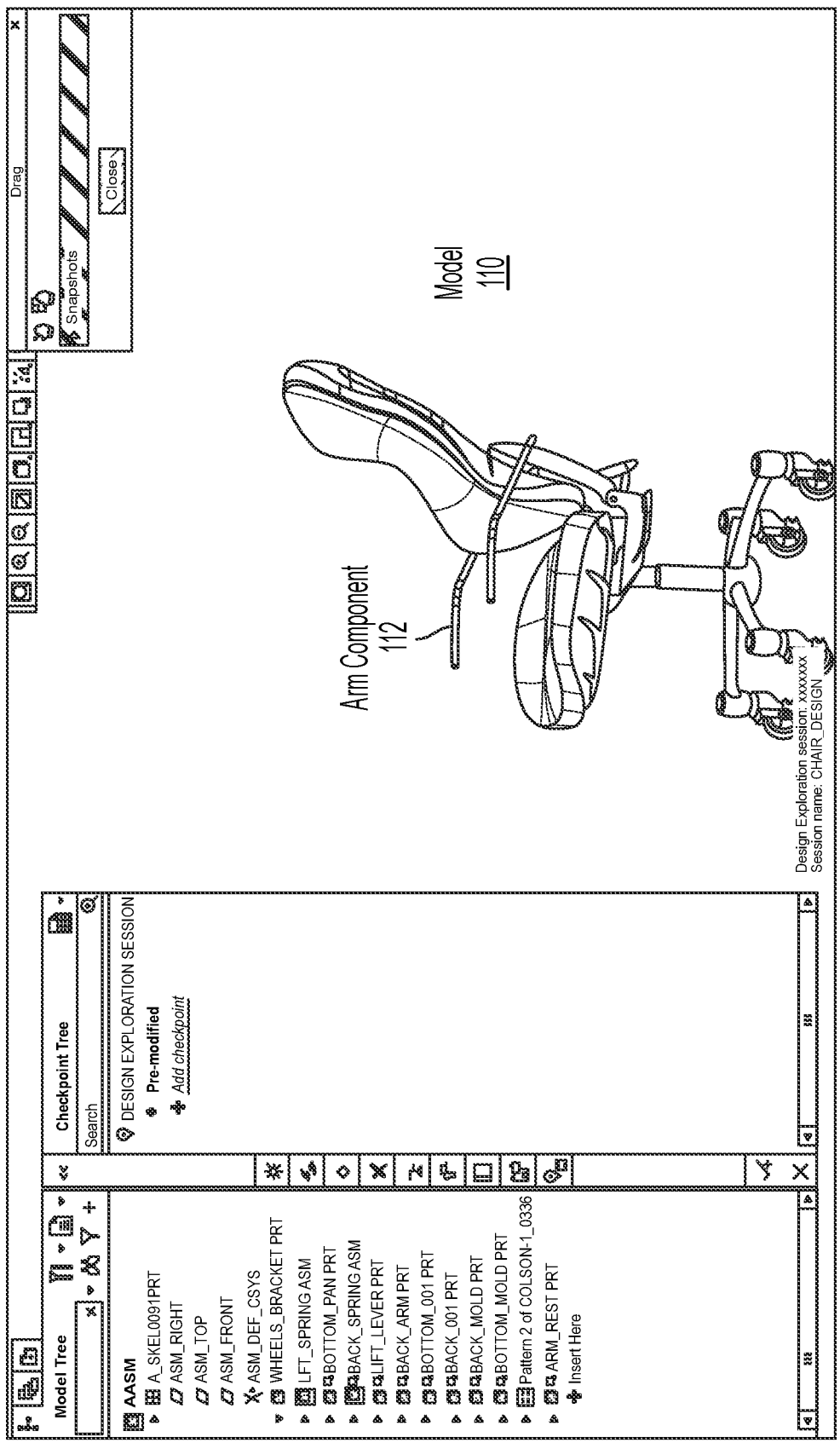

During the session, the model 110 may be changed, as shown in FIG. 1B. In this example, the arm components 112 have been modified to connect to the back of the chair, rather than the seat.

Figure 1C:
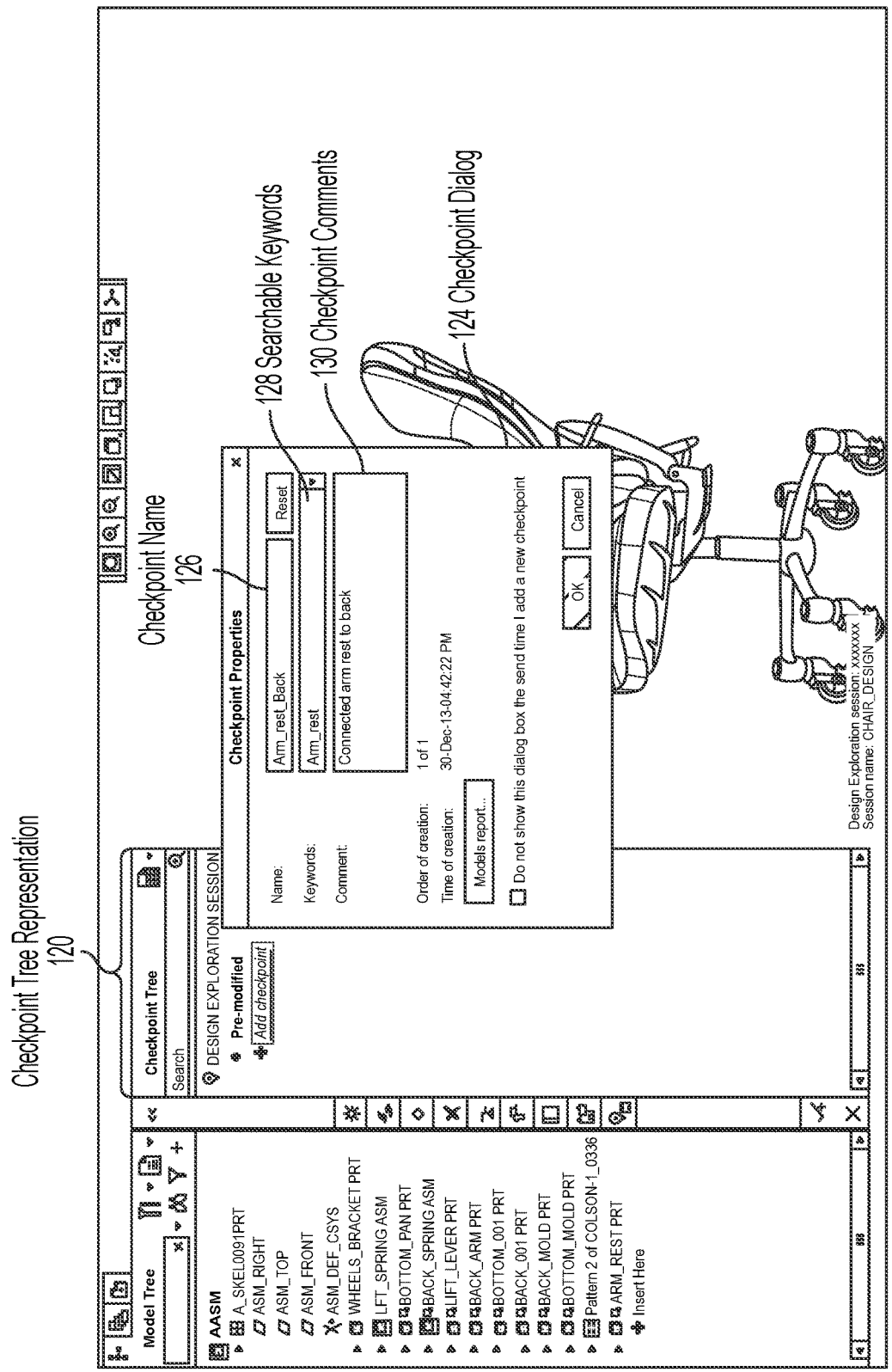

As changes are made to the model 110, the user may create a checkpoint representing the current state of the model 110. As shown in FIG. 1C, upon instructing the modeling environment to create a checkpoint, the modeling environment may display a checkpoint dialog 124 for entering information about the current checkpoint. The checkpoint dialog may include fields for creating a checkpoint name 126 to be displayed in the checkpoint tree representation 120, searchable keywords 128 that allow a user to search among the different checkpoints in the checkpoint tree representation 120, and checkpoint comments 130 allowing the user to describe the checkpoint for future reference.

Figure 1D:
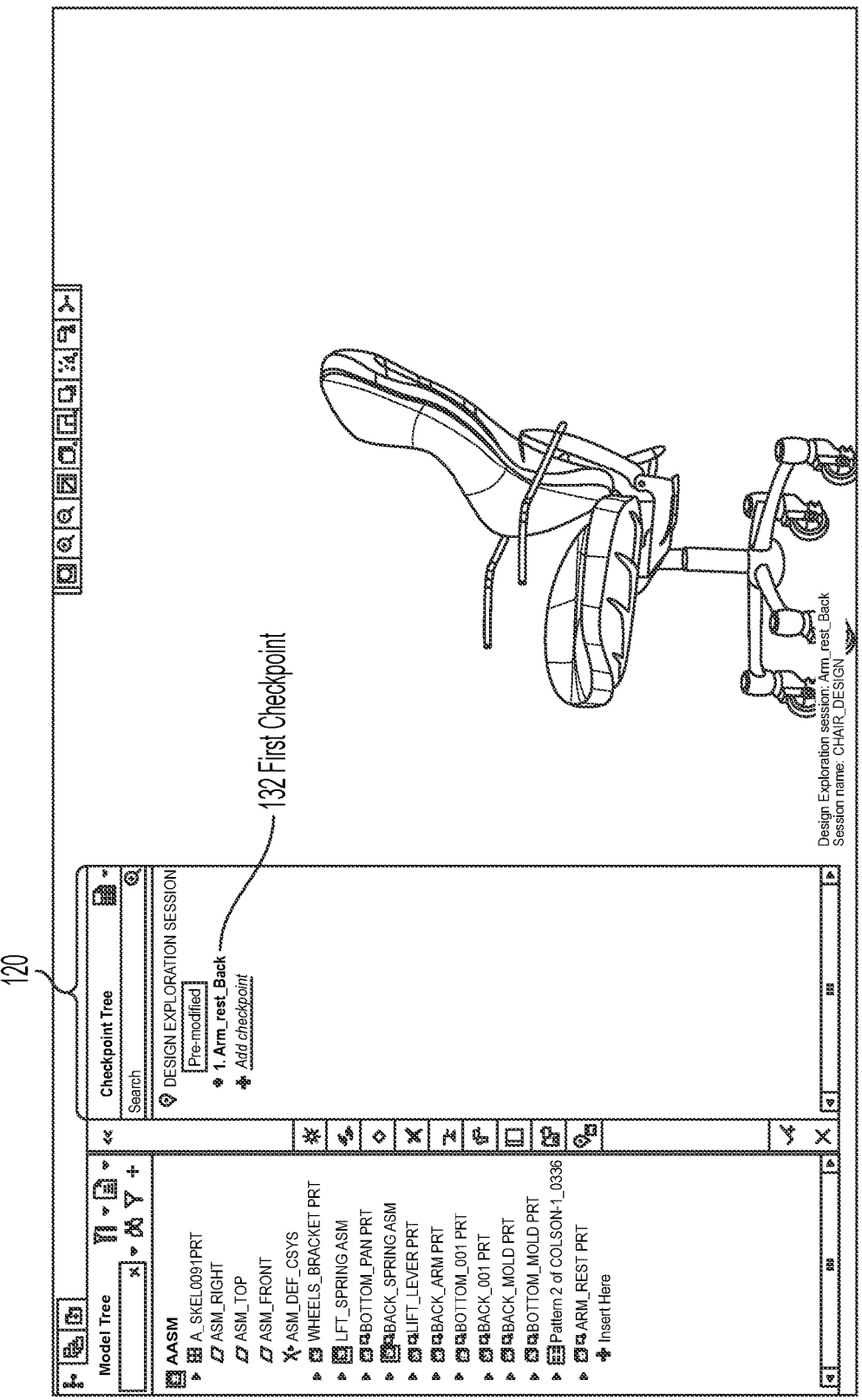

As shown in FIG. 1D, after creating a new checkpoint, the checkpoint 132 may be represented in the checkpoint tree representation 120. The user may then continue to edit the model 110 from the new checkpoint, or may revert to a different checkpoint to explore different design variations.

Figure 1E:
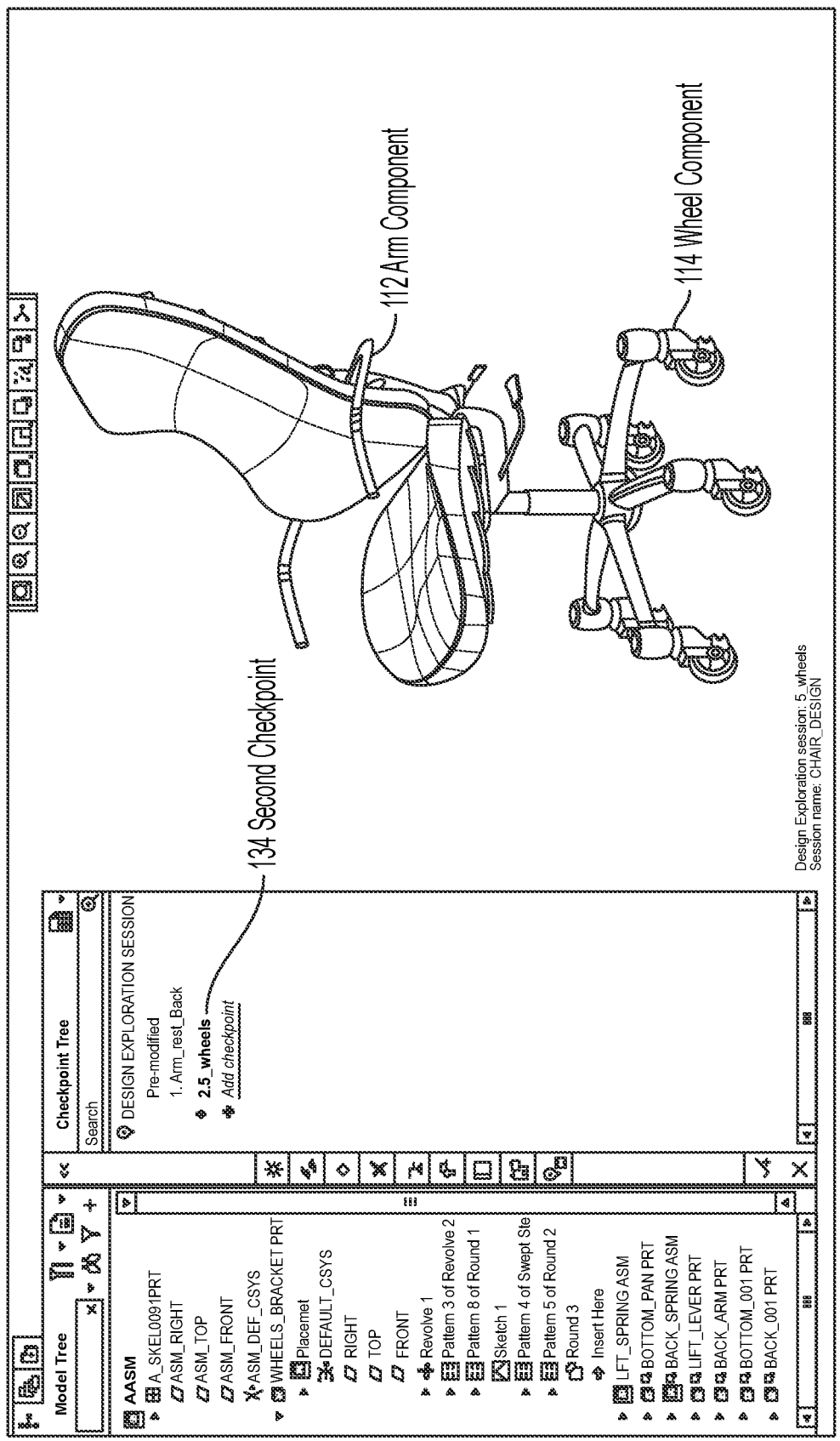

In the example depicted in FIG. 1E, the user continues to edit the model 110 from the first checkpoint. In this case, the user has modified the model 110 to include a fifth wheel component 114. The user may create a second checkpoint 134 capturing the state of the model with the updated arm component 112 and the updated wheel component 114.

Figure 1F:
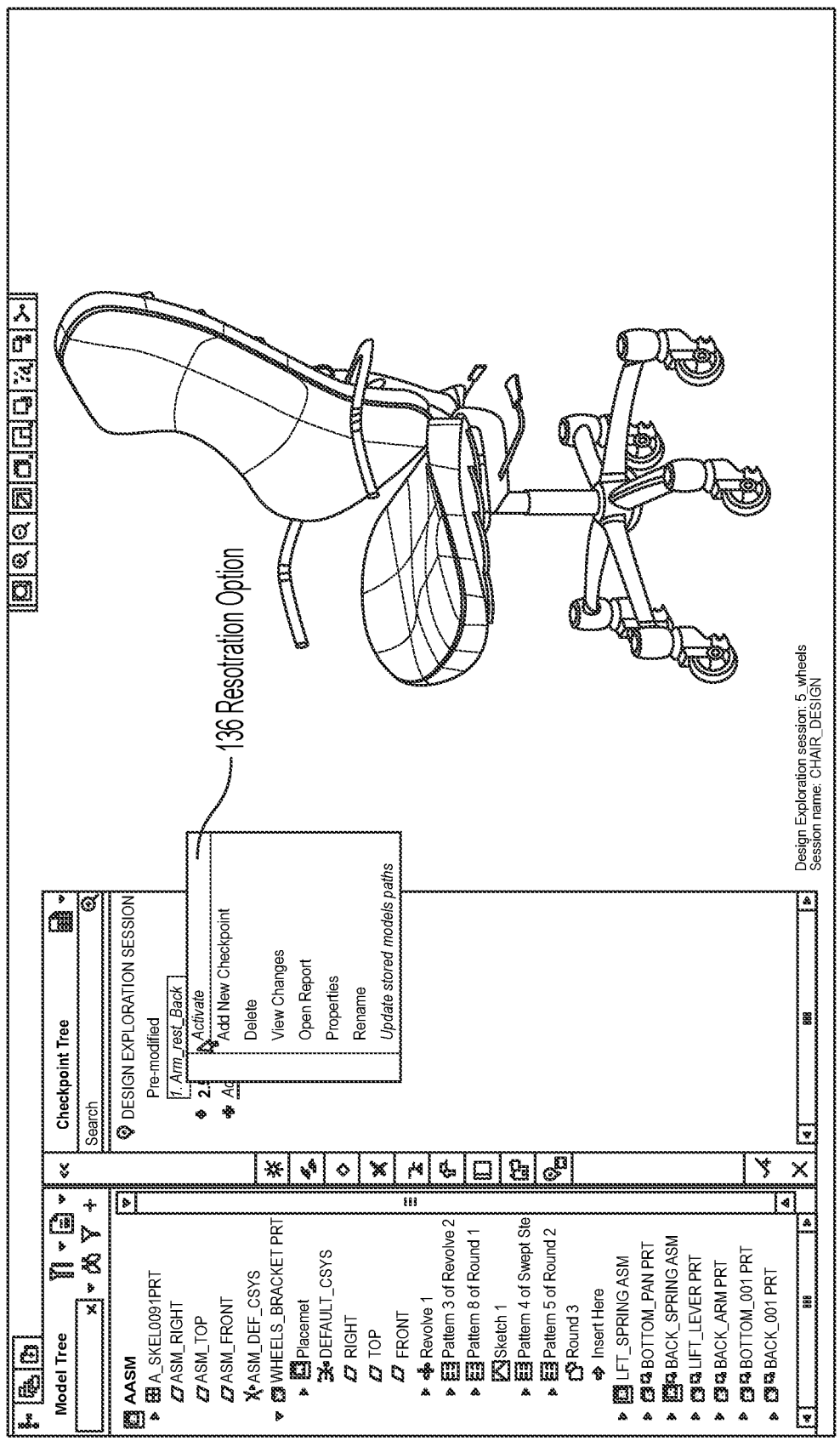

If the user wishes to revert to a previously saved checkpoint (e.g., the first checkpoint 132), the checkpoint may be selected in the checkpoint tree representation 120. As shown in FIG. 1F, a restoration option 136 may be displayed upon selecting the earlier checkpoint. If the user selects the restoration option 136, the model 110 may be restored to a state consistent with the earlier checkpoint. In this case, selecting the restoration option 136 associated with the first checkpoint 132 would revert the model 110 back to a state consistent with the first checkpoint 132 (e.g., the state of the model 110 as depicted in FIG. 1B).

Figure 1G:
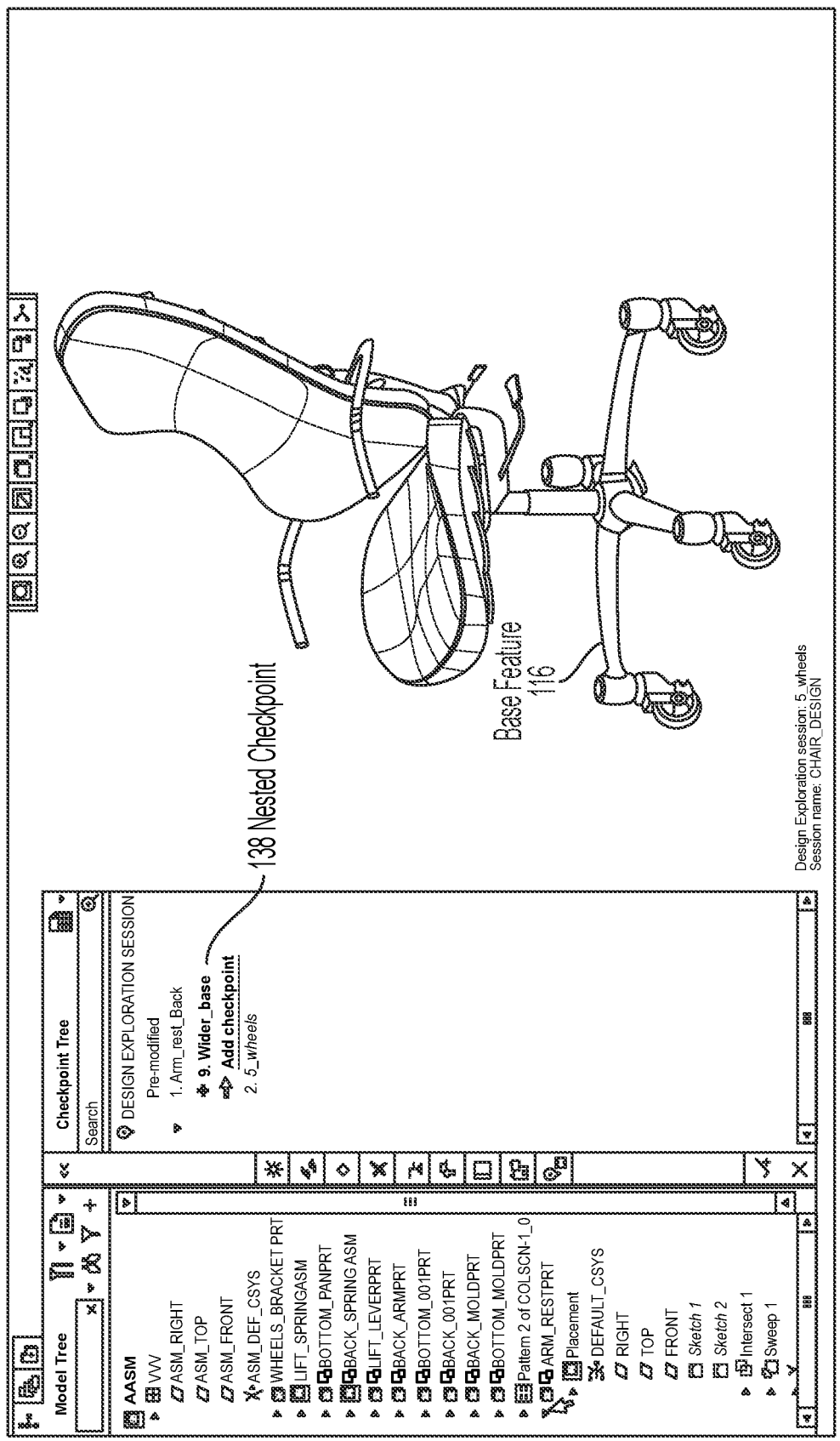

Checkpoints may be saved separately from each other, or a hierarchy of checkpoints may be created. For example, if the user begins at the first checkpoint 132 and modifies the model 110 further, a nested checkpoint may be created under the first checkpoint 132. In FIG. 1G, the user has modified the model 110 from the first checkpoint 132 to incorporate a larger base component 116. A nested checkpoint 138 is created under the first checkpoint 132 and depicted in the checkpoint tree representation 120. Nesting checkpoints in this manner may be useful to provide a visual indication of the relationship between checkpoints. By representing checkpoints as a hierarchy, design variations and processes may be more accurately and efficiently captured. For example, different branches in the hierarchy may be used to represent splits in the design process and/or different sequences of variations in the model.

Users may also delete checkpoints that are no longer needed. When a checkpoint in the hierarchy of checkpoints is deleted, information in the deleted checkpoint (such as saved component models and a reference to a previous checkpoint) maybe merged with later checkpoints before removing the deleted checkpoint. Therefore, the tree structure of the checkpoints may be maintained without loss of information.

Figure 2:
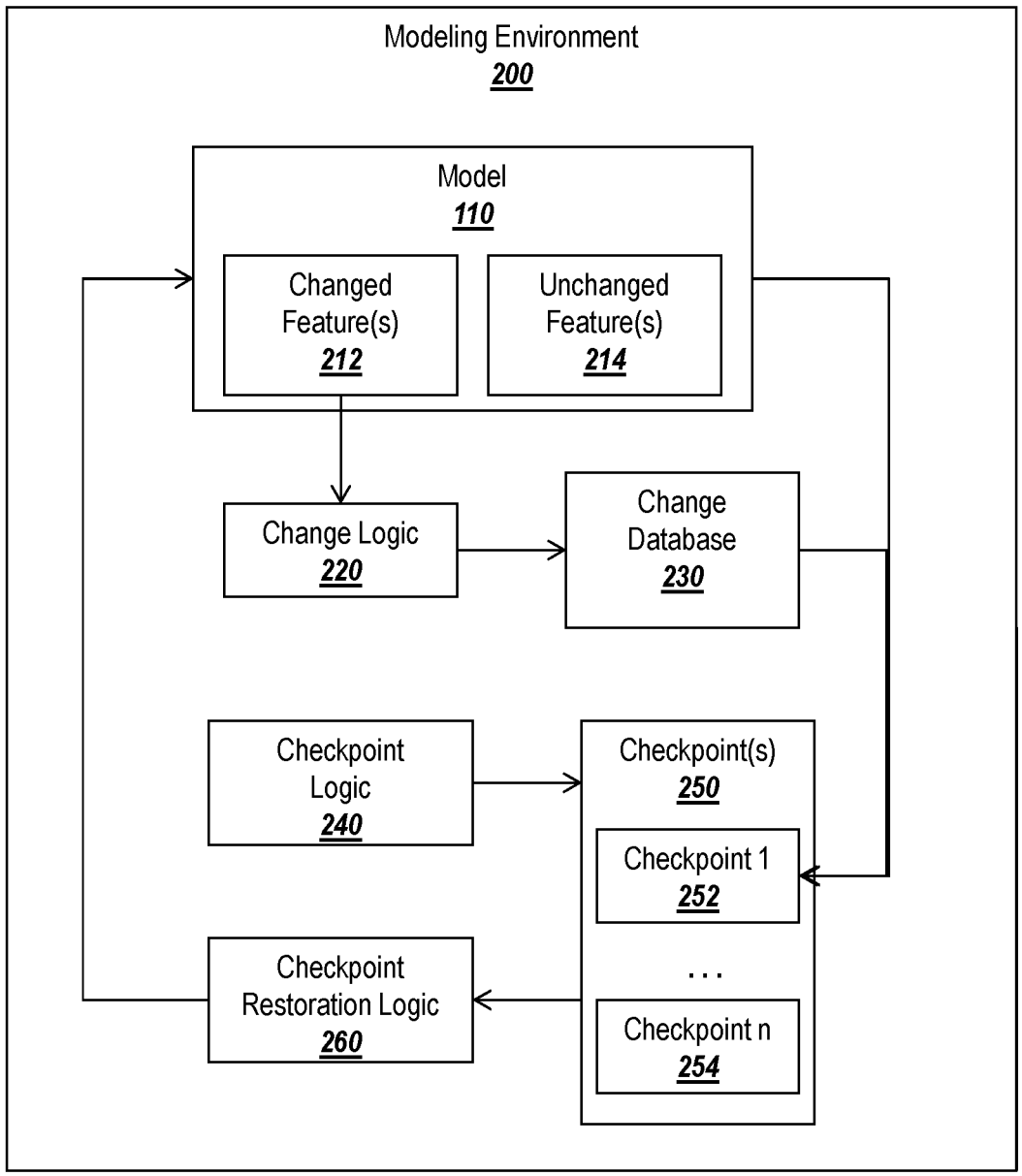
FIG. 2 depicts an example modeling environment suitable for use with example embodiments described herein.

FIG. 2 depicts an example modeling environment 200 for creating and managing checkpoints. One example of a modeling environment 200 is Creo® Parametric of PTC Inc. of Needham, Massachusetts. The modeling environment 200 may be resident on a local computing device, or may be accessed through a network.

A model 110 may be present in the modeling environment 200. The model 110 may include one or more assemblies, each assembly made up of one or more component models. The modeling environment 200 may provide tools for changing the model 110.

As the model 110 is changed, the model may include one or more changed components 212, and one or more unchanged components 214. The modeling environment 200 may track which components are changed and which are not in order to create the aforementioned checkpoints. In order to track which components have been changed and how the components have been changed, the modeling environment 200 may include change logic 220 for detecting the changes. For example, the change logic 220 may analyze incoming instructions to the modeling environment 200 to determine which instructions modify a geometry of a component to result in a changed component 212. Alternatively or in addition, the change logic 220 may periodically compare the current version of a component with a previous version of a component. If the current version does not match the previous version, then the change logic may log the component as having been changed.

Changes to a geometry of a component may be logged by the change logic 220 in a change database 230. The change database 230 may include a list of the changes to the model, as well as information about the resulting geometry of the changed component 212.

At any time, a user may instruct the modeling environment 200 to create a checkpoint for the model 110 (and/or for multiple models 110 edited in a session). Alternatively or in addition, the modeling environment 200 may automatically create checkpoints (e.g., upon the occurrence of predetermined events, such as the start of a design session, or at predetermined time intervals). Thus, the modeling environment 200 may include checkpoint logic 240 for defining how checkpoints 250 are created.

Upon creating a checkpoint 252, 254 for the current state of the model 110, the checkpoint 252, 254 may be stored in a checkpoint database. The modeling environment 200 may further include checkpoint restoration logic 260, which may retrieve one or more checkpoints 250 from the checkpoint database, and restore the model 110 to a state consistent with the retrieved checkpoint(s).

Figure 3:
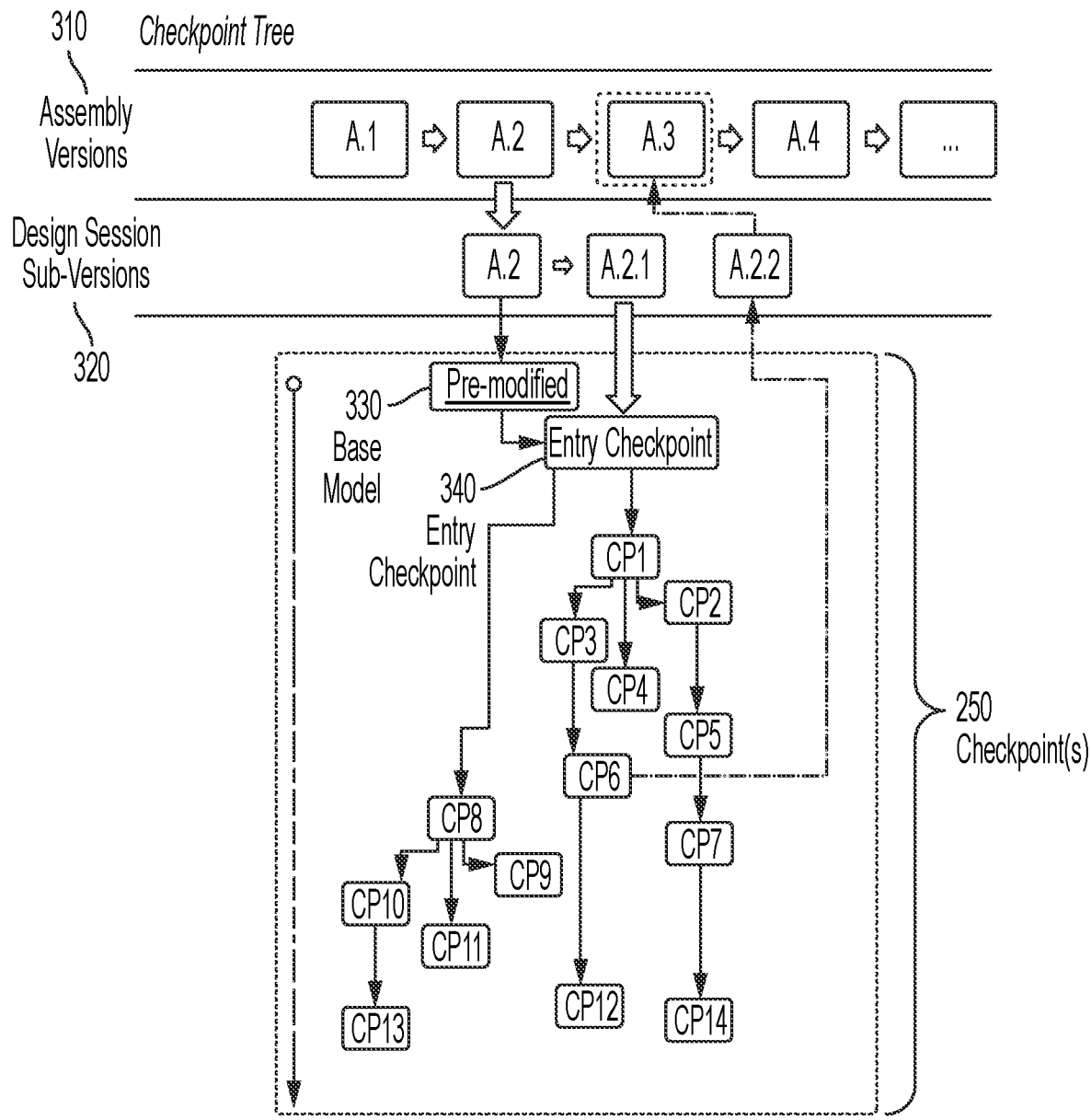
FIG. 3 depicts an example checkpoint tree for exploring and evaluating design variations of a component, assembly, or model according to example embodiments.

An example of checkpoints 250 arranged hierarchically in a checkpoint tree is depicted in FIG. 3. As shown in FIG. 3, an assembly may be associated with multiple assembly versions 310, each assembly version 310 representing a state of an assembly and the components that make up the assembly. Each assembly version 310 may also be associated with one or more sub-versions 320 defined in a design session. FIG. 3 depicts an example in which a user is working on version 2 of an assembly in order to create a version 3 of the assembly.

As shown in FIG. 3, the initial version (version 2) of the assembly is imported into a design session and used as the initial "pre-modified" base model 330 for the design session. An entry checkpoint 340 may be created upon the start of the design session, where the entry checkpoint 340 stores the base model 330 and serves as the root of a tree of checkpoints 250. Multiple checkpoints 250 may be created as the user edits the model, and the user may select one of the checkpoints to be used as the next sub-version 320 for the assembly.

In the example depicted in FIG. 3, the user has modified the base model 330 to create a first checkpoint, and modified the model associated with the first checkpoint in three different ways to create second, third, and fourth checkpoints. The user then returned to the second checkpoint and used that checkpoint as the basis for a fifth checkpoint, then returned to the third checkpoint and used that checkpoint as the basis for a sixth checkpoint. This process continued, and eventually the user decided that the sixth checkpoint represented the version of the model to be used as the next official sub-version 320. Although the user could have iterated through further sub-versions 320, the user decided that this sub-version 320 was satisfactory, and made this sub-version the official version (version 3) of the assembly In a conventional component-based modeling system, models may be stored as files that are loaded at runtime. As a user makes changes to the model, new files may be created for the changed components, which may also be stored in (separate files). Accordingly, in the above example, the user might have created multiple different model save files for each of the fourteen checkpoint versions depicted.

In order to restore a prior version of the model, each of the model files associated with components in the model may need to be reloaded and the components regenerated. For example, the files associated with the components in the requested version of the model may need to be retrieved from storage and processed in order to create a new in-memory version of the model. In the above example, in order to evaluate each of the fourteen different versions, the user may have loaded the save file(s) for the selected versions, which would have caused the entire model and all of its constituent components to be reloaded. This consumes large amounts of both storage and processing resources.

However, the checkpoints 250 depicted in FIG. 3 are able to leverage information in the change database 230 in order to save and restore only those model components which have been changed since the previous checkpoint. For example, after retrieving files relating only to the components in the checkpoint that differ from the current version of the model, the current in-memory version of the model can be updated using only the changed components. This may save significant processing resources, since all of the component files making up the model do not necessarily need to be loaded and the entire model does not need to be regenerated.

In some embodiments, references (e.g., pointers) to the changed components may be saved in the checkpoints, further decreasing the amount of storage space needed to store each checkpoint. By saving and processing only the changed components as identified by the change database 230, a checkpoint stores and processes a smaller amount of information than the conventional backup methodology. An example of a change database 230 is depicted in FIG. 4.

Figure 4:
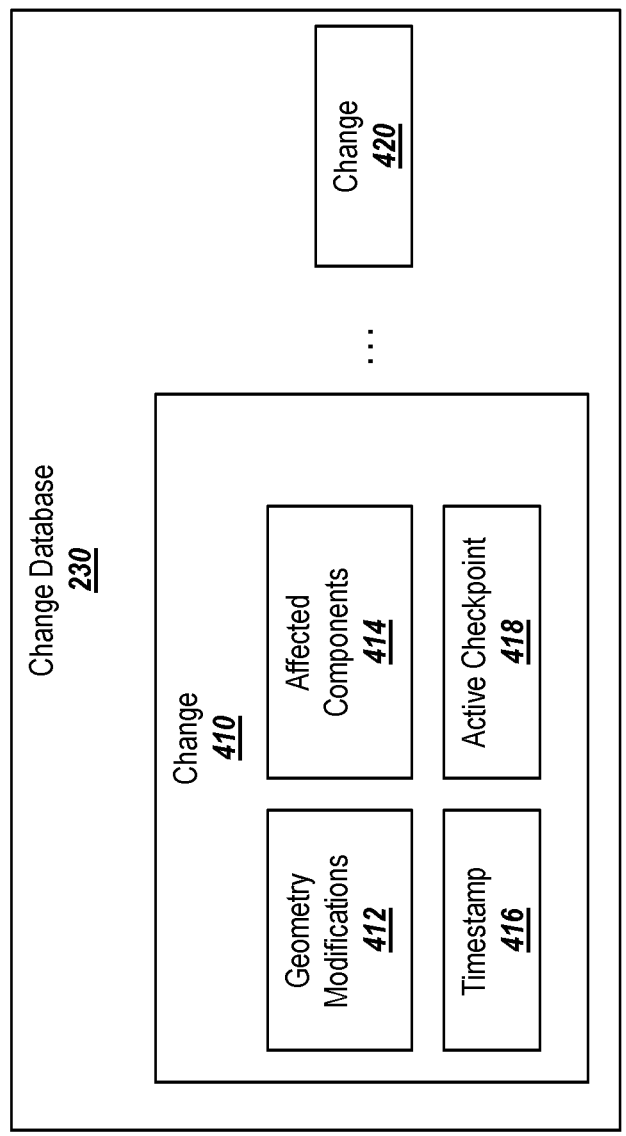
FIG. 4 depicts an example change database for tracking changes to components in a model in a component-based modeling environment according to an example embodiment.

As shown in FIG. 4, each time an instruction is received by the modeling environment that results in a change to the geometry of one of the components of the model, information pertaining to the instruction may be stored as a change 410 in the change database 230. In addition, if the instruction causes a derived change to occur (e.g., due to a parametric relationship or parametric constraint), the derived change may also be logged as a change 410 in the change database 230.

The change 410 may include one or more geometry modifications 412 that result from the instruction. The geometry modifications 412 may include, for example, a description or edges, vertices, and surfaces of a feature that are affected by the change. The geometry modifications 412 may include information on the new geometry that would result from the change, may include information about the previous state of the geometry, and/or may include information about how to go from the old geometry to the new geometry.

The change 410 may further include a list of affected components 414 that are affected by the change. The affected components 414 may include the components directly changed by the change, and may include a list of associated components for which derived changes may be carried out as a result of the current change. The associated components may be identified, for example, by inspecting parametric relationships associated with the model and/or by analyzing components connected to the changed components in the model.

The change 410 may further include administrative information, such as a timestamp 416 describing the time at which the change was made (and potentially session information providing details about the session in which the change was made). The change 410 may also include an active checkpoint 418, indicating which checkpoint was being edited at the time the change was made.

Further changes 420 may be logged in the change database in a similar manner.

Figure 5:
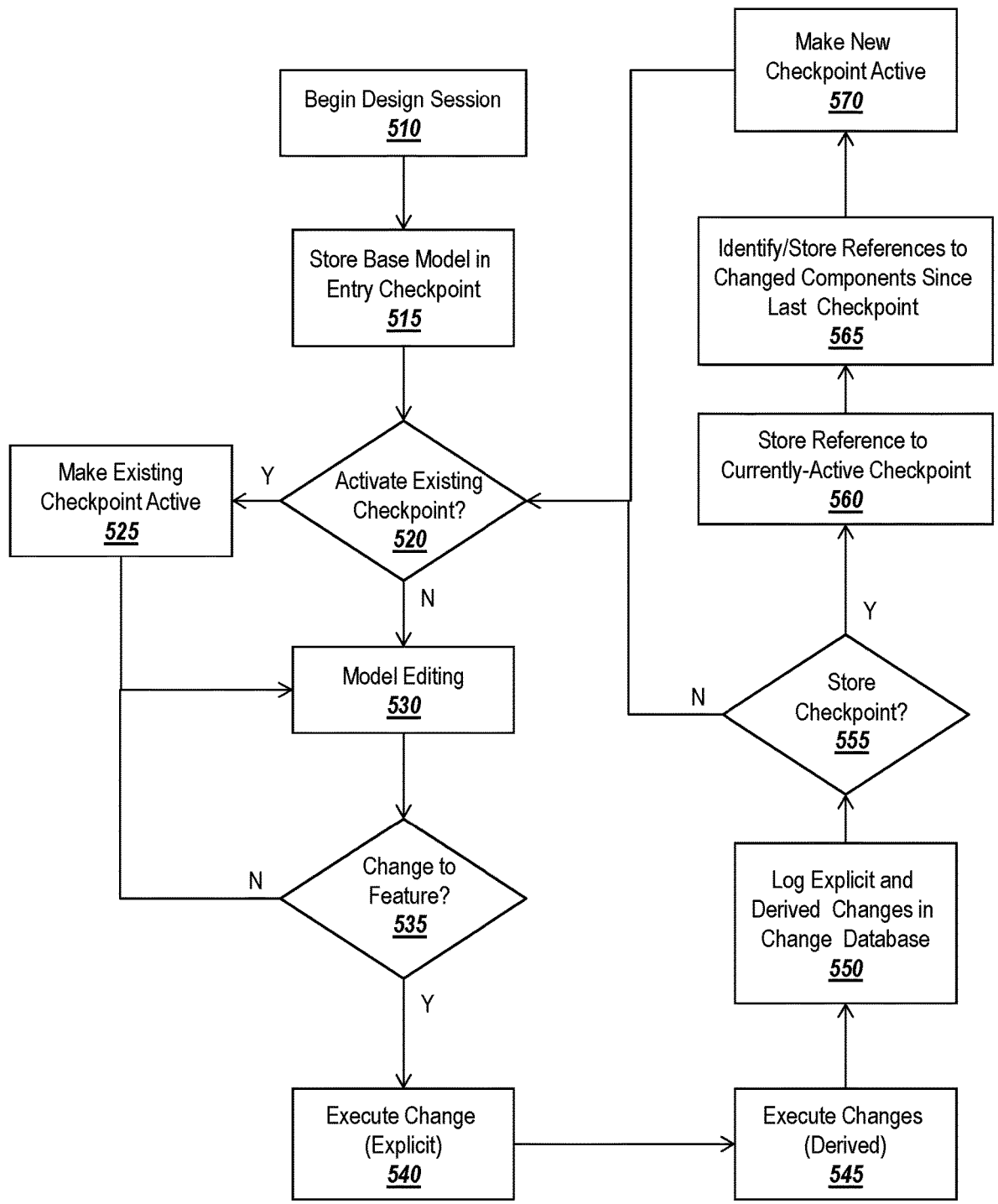
FIG. 5 is a flowchart depicting an example method for creating a checkpoint according to an example embodiment.

The changes in the change database 230 may be used to create a checkpoint. An example process for creating a checkpoint is depicted in the flowchart of FIG. 5.

At step 510, a design session may be begun. The design session may be started automatically, such as when a component-based modeling application is launched or when a new component is imported into the modeling environment, or may be started manually, such as when a user instructs the modeling environment to begin a design session (e.g., by selecting a menu option to enter a design session).

Optionally, a design session may be loaded from a design session file. In this case, any checkpoints stored in the design session file may be imported into the modeling environment and displayed in a checkpoint tree.

At step 515, after starting the design session the modeling environment may store the current state of any active models in the modeling environment as base models. There may be more than one model active during a session. The base model may represent an unmodified version of the model as it existed when the design session started. An entry checkpoint consisting of a representation of the base model (without any changes) may be created at this step.

It may be the case that the components of the base model already exist on one or more storage devices associated with the modeling environment. In this case, it may be unnecessary to save the components (a second time) as the base model. Therefore, according to an example embodiment, at the beginning of the design session the modeling environment may store the initial state of the assembly of components as the base model. This may be accomplished, not through saving each component individually, but by saving a link (e.g., a pointer) to all initial component files on the storage device(s) that have been loaded into the modeling environment. The modeling environment may save to disk only those components that have been modified after loading the components to the modeling environment.

In some embodiments, the base model file(s) or pointers to the base model file(s) may be stored in the entry checkpoint, and the entry checkpoint may be stored in a design session file associated with the design session. The system may search for base model file(s) in a hierarchical manner. For example, when searching for base model file(s), the system may first search the design session file to look for pre-modified models. In the event that the pre-modified model file(s) are not found in the design session file, the system may then check the current working folder or model workspace, and then search in defined search paths. If the model file(s) are not found, an interface may be presented to a user to allow the user to manually browse and search for the model file(s).

There may be several reasons not to back up the entire base model into the design session file, if it is not necessary to do so. First, saving only a reference (e.g., a pointer) to a file that is already saved on disk reduces the size of the design session file and reduces duplication/redundancy when some model files are available on their original paths. Furthermore, if the model files are backed up to the design session file, this may (in some circumstances) result in naming conflicts when the checkpoint is eventually "accepted" and the base model files are loaded into the model workspace with the active checkpoint iterations, while unmodified models copies are available with same name already on PDM system.

Nonetheless, in some embodiments the base model files may be backed up to the design session file. This may be particularly useful, for example, when the design session file is moved to a different computer which does not include base versions of the model saved to disk, or does not have access to the same file system or original locations or network.

If the design session was loaded from a design session file, then the entry checkpoint in the design session file may be loaded and the base model of the entry checkpoint may be retrieved by the modeling environment. If the base model is not already present in the modeling environment, then the modeling environment may import the base model from the design session file and load the base model in the modeling environment. In addition to loading the base model, the design session file may allow other details of the design session, such as environment characteristics, to be restored. For example, if a first user stored a design session with several open windows/models and a second user opened the associated design session file, then the design session file may also open the windows/models on the second user's computer.

At step 520, the user may optionally request that an existing checkpoint be activated. If no existing checkpoints exist, or if the user does not choose to activate an existing checkpoint, processing may proceed directly to step 530. If the user does activate an existing checkpoint, then processing may proceed to step 525 and the modeling environment may make the selected checkpoint active. An example procedure for activating a checkpoint is described in more detail with respect to FIG. 7.

Once the desired checkpoint (either the entry checkpoint or a selected checkpoint) is activated, processing may proceed to step 530 and the user may edit the model. As the user makes changes to the model, processing may proceed to step 535 and the modeling environment may determine whether any of the user edits result in a change to a component of the model. If not, processing may return to step 530 until an edit results in a change to a component.

If it is determined at step 535 that a component of the model has been changed, then processing may proceed to step 540 where the explicit changes caused by the user edits may be carried out. As the changes are carried out, the modeling environment may analyze associated components that are dependent on the changed component and/or may retrieve parametric relationships/constraints associated with the changed component. If it is determined that the explicit changes require derived changes in an associated component, then at step 545 the derived changes may be carried out.

At step 550, each of the explicit changes and the derived changes may be logged in the change database. At this point, the model has been changed, and the user may instruct the modeling environment to store the changed model in a checkpoint. Alternatively or in addition, an automatic checkpoint may be triggered at this time. Accordingly, processing may proceed to step 555, where the modeling environment may determine whether to store a checkpoint.

If it is determined at step 555 that a checkpoint should be saved (e.g., because the modeling environment has received an instruction to store the checkpoint, because a predetermined period of time has elapsed since the last checkpoint was saved, or because a predetermined event has occurred), then processing may proceed to step 560. Otherwise, processing may return to step 520, and it may be determined whether an existing checkpoint has been made active.

At step 560, the modeling environment begins the process of creating a new checkpoint. The modeling environment may determine which checkpoint is currently active. For example, if the user is editing the base model from the entry checkpoint, then the entry checkpoint is considered the currently-active checkpoint. If the user made a different checkpoint active at step 520, then the activated checkpoint may be considered the currently active checkpoint.

A reference to the currently active checkpoint may be stored in a new checkpoint. For example, the currently-active checkpoint may be represented as a location in memory or on a storage medium. A pointer to the address of the currently-active checkpoint may be stored with the new checkpoint in step 560. Processing may then proceed to step 565.

At step 565, the modeling environment may consult the change database to determine which components have been changed since the currently-active checkpoint was activated. Any components that were changed between the activation time of currently-active checkpoint (e.g., the checkpoint activated at step 525, or the entry checkpoint created at step 515) and the time at which it was determined to store a new checkpoint (e.g., as a result of a "YES" determination at step 555) may be stored with the new checkpoint.

Each component may be represented by a component model file. Although possible, it may not be necessary to store the entire component model file in the checkpoint for each changed component. Rather, the component model file associated with the component may be stored at a known location in a memory, and the address of the known location may be saved with the checkpoint (e.g., as a pointer). Alternatively or in addition, the name/path of the component model or component model file may be stored in the checkpoint.

At step 570, the new checkpoint consisting of the reference to the earlier checkpoint and the components changed since the earlier checkpoint has been successfully created. The checkpoint is made the currently-active checkpoint, and processing may return to step 520 to determine if the user wishes to revert to a different checkpoint (or, alternatively, to continue to edit the currently active checkpoint at step 530).

At the end of a design session, any checkpoints created during the design session (including the entry checkpoint) may be stored in a design session file. The design session file may be distributed to other computers in order to allow other uses to evaluate the design variants captured by the checkpoints. If the base model saved at step 515 included references to model components stored locally on the disk (as described above), then an option may be presented for copying the model file from disk into the design session file. Therefore, if the design session file is distributed to another computer that does not have a local copy of the base model, the base model may be retrieved from the design session file.

The method described in FIG. 5 results in the creation of one or more checkpoints. An example of a data structure for checkpoints is depicted in FIG. 6.

Figure 6:
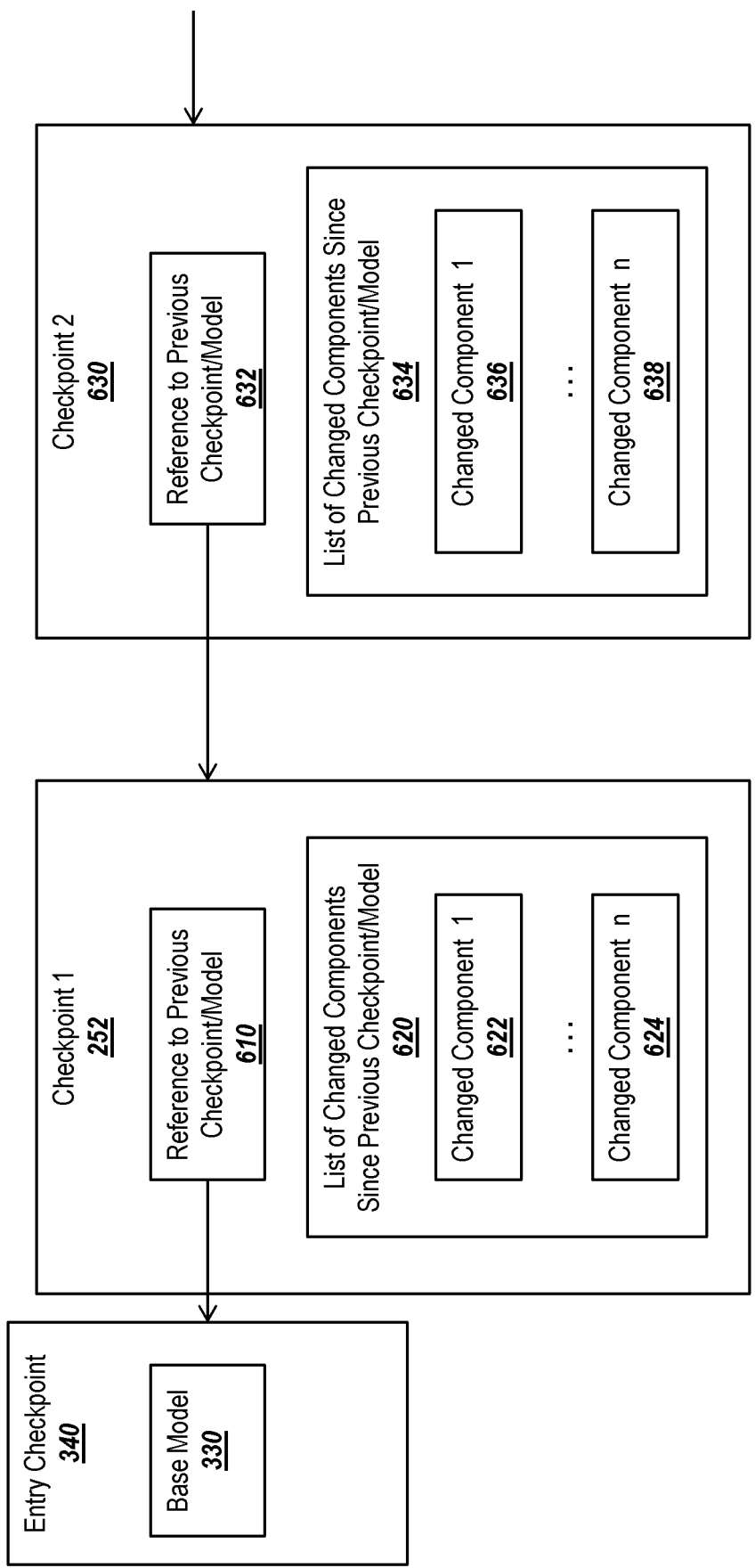
FIG. 6 depicts an example checkpoint data structure suitable for use with an example embodiment.

As shown in FIG. 6, the initially-created checkpoint may be the entry checkpoint 340. The entry checkpoint may consist of a representation of the base model 330, without any associated changed features.

After editing the base model 330, an additional checkpoint 252 may be created. This checkpoint 252 may include a reference to a previous checkpoint 610. The reference 610 may be, for example, a pointer. In this case, the checkpoint 252 was created based on edits to the base model 330. Accordingly, the reference 610 points back to the entry checkpoint 340.

The checkpoint 252 may further include a list of changed components 620 that were changed since the previous checkpoint. The list may include pointers to the component model files of the changed components and/or paths to the component model files, among other possibilities. One or more changed components 622, 624 may be included in the list 620. Further checkpoints 630 having references 632, and a list 634 of changed components 636 may be created as needed. In the example shown in FIG. 6, the second checkpoint 630 was created based on the version model represented by the first checkpoint 252, and accordingly points back to the first checkpoint 252 through the reference 632.

It is to be understood that the references from multiple different checkpoints may each point to the same previous checkpoint, as in the case of a tree structure where multiple checkpoints share a single parent.

Figure 7:
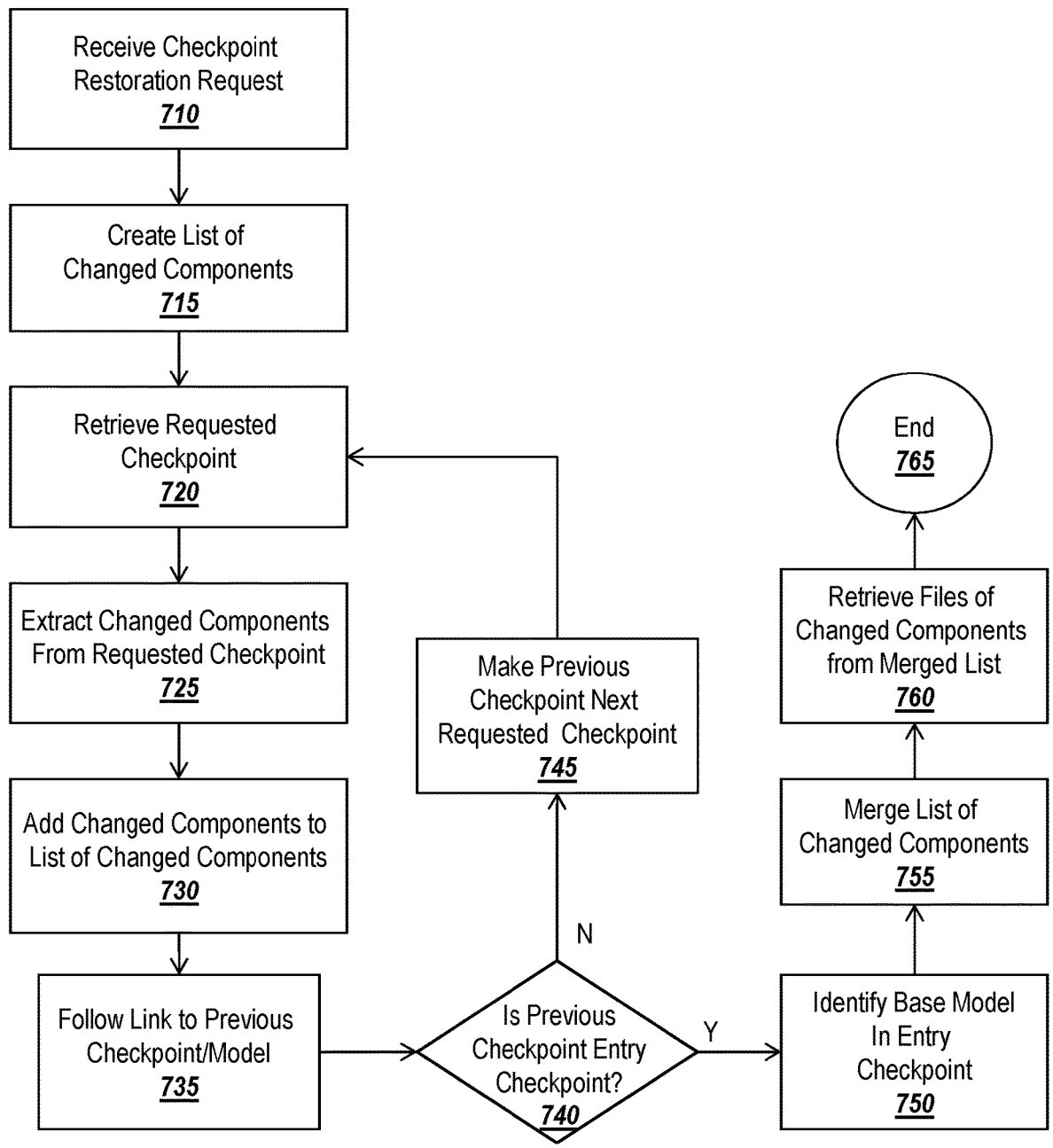
FIG. 7 is a flowchart depicting an example method for restoring a component, assembly, or model from a checkpoint according to an example embodiment.

Once a checkpoint is created, the checkpoint may be activated to restore the model to a state consistent with the checkpoint. FIG. 7 depicts an example method for activating a checkpoint. In brief summary, the procedure described in FIG. 7 involves: selecting a checkpoint; using the reference contained in the checkpoint to recursively step backwards through the hierarchy/tree of checkpoints to the entry checkpoint while accumulating a list of changed components associated with each checkpoint along the way; merging the list of changed components to identify the correct (e.g., most recent) version of the changed component to be used in the model, and changing only those components of the base model that need to be regenerated, while preserving any unchanged components.

At step 710, the modeling environment may receive a request to activate or restore an identified checkpoint. The checkpoint restoration request may be received, for example, by activating the checkpoint in the checkpoint tree. The checkpoint identified in the request is made the currently-active requested checkpoint.

At step 715, the modeling environment may create an initially empty list of changed components. As checkpoints are retrieved throughout the procedure described in FIG. 7, components which have been changed at each checkpoint may be added to the list of changed components.

At step 720, the modeling environment may retrieve the currently-requested checkpoint. The checkpoint may be stored, for example, as a data structure in memory, and at step 720 the data structure associated with the identified checkpoint may be accessed. The data structure may include a reference to an earlier checkpoint, and a list of changes that occurred between the earlier checkpoint and the currently-active requested checkpoint.

At step 725, the modeling environment may extract a list of changed components from the requested checkpoint. The list of changed components may represent the components which were changed between the currently loaded checkpoint and the immediately preceding checkpoint. At step 730, the list of changed components retrieved from the current checkpoint may be added to the list of changed components created at step 715. As the changed components are accumulated in the list, the modeling environment may maintain a record of the order in which the components were changed and/or may identify which changed component represents the "most recent" version of a component (e.g., the version of the component that is most up-to-date in relation to the checkpoint requested at step 710).

At step 735, the modeling environment may follow the reference to the earlier checkpoint retrieved from the requested checkpoint. At step 740, the modeling environment determines whether the earlier checkpoint is the entry checkpoint. The entry checkpoint may be identified, for example, based on the structure of the entry checkpoint. For example, all the non-entry checkpoints may include a reference to an earlier checkpoint and a list of changed components. In contrast, the entry checkpoint may include a representation of the base model and no changed components.

If the answer at step 740 is "YES," then all necessary changed components have been identified, and processing may proceed to step 750. If not, further changes may need to be accumulated, and processing may proceed to step 745.

At step 745, the previous checkpoint accessed through the reference in the active checkpoint is made the new currently-active requested checkpoint. Processing may then return to step 720, where the remaining checkpoints are recursively processed until arriving at the entry checkpoint.

At step 750, all necessary changed components have been accumulated, and the modeling environment has identified an entry checkpoint having a base model. The modeling environment may identify the base model in the entry checkpoint, which may involve extracting a list of components present in the base model.

At step 755, the modeling environment may consult the list built at step 730 to determine which components of the base model have been changed between the entry checkpoint and the requested checkpoint. For example, the list of changed components may be merged so that only the most recent version of the component (as compared to the requested checkpoint) is used.

Any features that have not been changed since the base model was created may be considered unchanged features. A list of unchanged features may also be created in addition to the list of changed components.

The system has now accumulated lists of components that make up the model as represented by the requested checkpoint (the unchanged features and the changed features). The lists may be compared to the set of components present in the currently active model that is loaded in memory. If any of the components match the version of the components that are present in the currently active model, these components may be left in their current form (thereby reducing the need to regenerate the components of the model). At step 760, the modeling environment may retrieve the most recent version of the components identified in the merged list from step 755 that are not present in the currently active model. For example, the modeling environment may retrieve the component model file (or version of the component model file) associated with the most recent version of the components as identified in the merged list and/or unchanged component list.

The components retrieved at step 760 may be applied to the model so that the retrieved components replace existing components in the model. Alternatively or in addition, existing components may be removed or the retrieved components may be added to the model in order to make the model consistent with the checkpoint.

In order to make the model consistent with the checkpoint, the retrieved components which are introduced to the model may have their features, parameters, and/or geometries manipulated in order to maintain or reconstruct parametric dependencies and relationships that exist either at the component-level or at the feature/parameter/geometry level.

In some embodiments, only the changed components may be replaced in order to make the model consistent with the checkpoint. After replacing these components, the system may recalculate or regenerate dependencies and/or relationships among the changed components (and/or any components related to the changed components by parametric dependencies or relationships) based on the modified component structure in the updated model. This may involve making changes to components that were already present in the model and that were not previously regenerated/updated at steps 755-760.

Processing may then proceed to step 765 and terminate.

In some embodiments, it may not be necessary to step all the way back to the original entry checkpoint. If the model is currently at a state represented by a first checkpoint in the checkpoint tree, and the requested checkpoint is an earlier or later checkpoint on the same branch on the checkpoint tree as the first checkpoint, then it may be possible to step back only between the first checkpoint and the requested checkpoint, changing only those components which have been changed between the two checkpoints.

For example, with reference to the example at FIGS. 1D and 1G, the first checkpoint 132 represented a chair with arm components 112 that attach to the back of the chair and four wheel components 114 attached to a narrow base component 116. The nested checkpoint 138 (which lies along the same branch of the checkpoint tree as the first checkpoint 132) represented a chair with arm components 112 that attach to the back of the chair and four wheel components 114 on a wide base component 116.

If the nested checkpoint 138 is the currently active checkpoint and the user decides to activate the first checkpoint 132, the modeling environment may identify that these checkpoints are located on the same branch of the checkpoint tree. By moving backwards from the nested checkpoint 138 to the first checkpoint 132, the modeling environment may determine that the only change to the model between these two checkpoints is that the base component 116 was widened. Thus, in order to revert back to the first checkpoint 132, it may be sufficient load only the base component 116 and change any components related to the base component 116 by parametric relationships, thus preserving most of the components of the chair model and modifying only the width of the base component 116. This may save processing resources when loading the previously checkpointed version of the model.

An example of creating and restoring a checkpoint is next described.

Consider an example of a bike assembly stored in a model file "bike.asm". The bike.asm file may be stored in an assembly models folder that includes files representing the different parts of the bike (e.g., a file "handlebar.prt" representing a handlebar component, a file "front_wheel.asm" representing a front wheel assembly, a file "rear_wheel.asm" representing a rear wheel assembly, and a file "seat.prt" representing a seat component). Upon initiating a design session, an entry checkpoint may be created. The entry checkpoint may include a pointer to the original assembly models folder containing the bike.asm file as a base model and the components included in it.

If a user then changes the geometry of the handlebar part (component) of the bike, a new version of the handlebar.prt file may be generated. The user may indicate that a first checkpoint may be created. Checkpoint 1 may be an iterated version of the handlebar.prt file.

The user may then change the geometry of the front wheel, rear wheel, and seat of the bike and create a new checkpoint. Checkpoint 2 may include a reference to checkpoint 1 as well as new iterated versions of the front_wheel.asm file, the rear_wheel.asm file, and the seat.prt file.

The user may then modify the placement of the seat on the bike model and create a third checkpoint. Checkpoint 3 includes a reference to checkpoint 2 and a new version of the bike.asm file reflecting the changed placement of the seat component.

Assume now that the user closes the design session and exits the modeling environment. The user may then re-open the modeling environment and load some version of the bike from storage. If the user then requests that the bike be restored to a state consistent with checkpoint 3, the modeling environment may collect: the handlebar.prt file from checkpoint 1; the front_wheel.asm file, the rear_wheel.asm file, and the seat.prt file from checkpoint 2; and the bike.asm file from checkpoint 3. Any components in the currently-active version of the model in memory that are not consistent with these model files may be replaced and regenerated. If there were other components in the Bike assembly that were not iterated during the session-those will be loaded from the initial checkpoint (if available) or from their original location.

Alternatively, the user may request that the third checkpoint be restored without loading any current model into memory. In this case, the modeling environment may load any necessary files based on the base model in the entry checkpoint and any changed components reflected in subsequent checkpoints.

Figure 8:
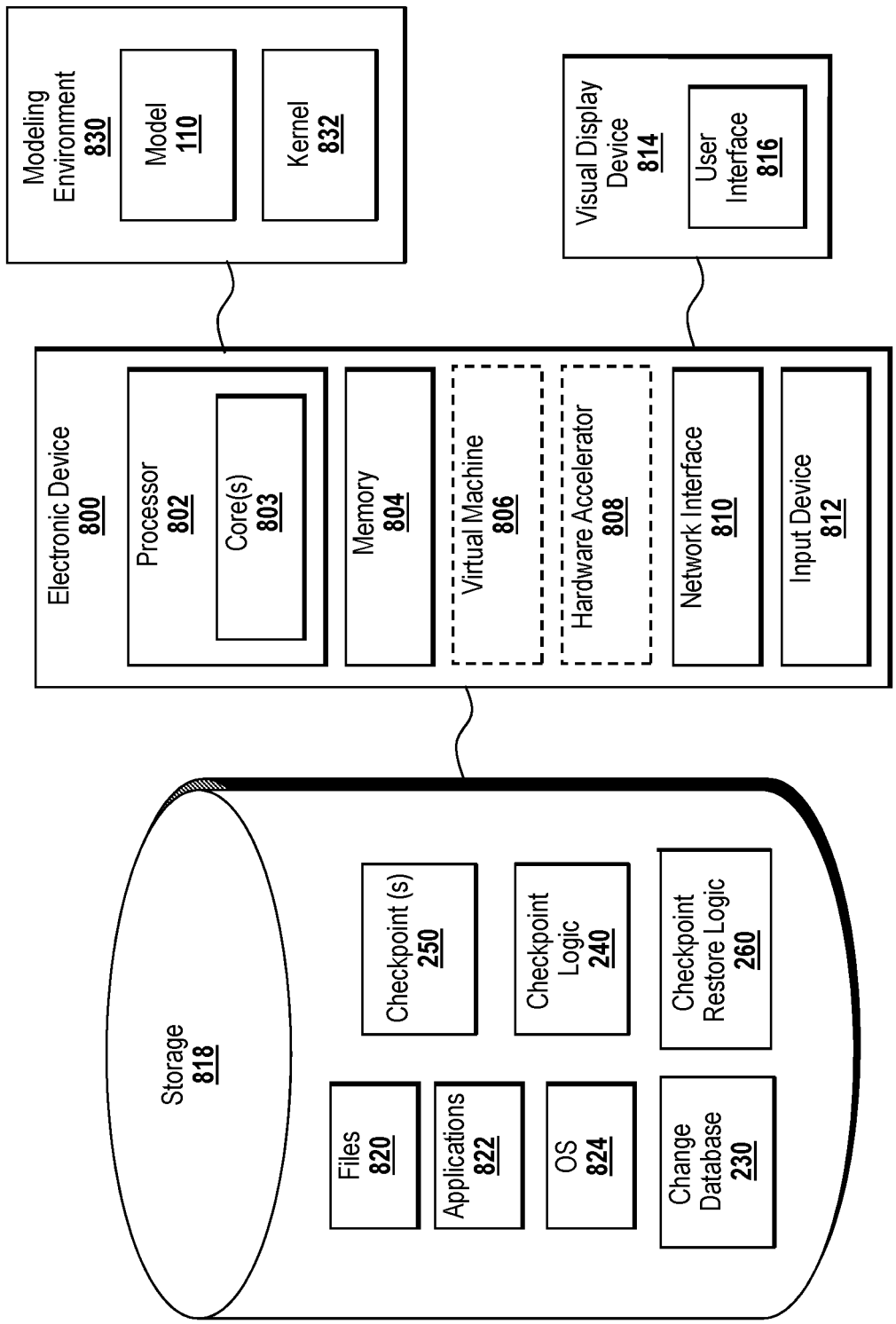
FIG. 8 depicts an example computing device suitable for use with example embodiments described herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 8 depicts an example of an electronic device 800 suitable for use with one or more embodiments described herein.

The electronic device 800 may take many forms, including but not limited to a computer, workstation, server, network computer, quantum computer, optical computer, Internet appliance, mobile device, a pager, a tablet computer, a smart sensor, application specific processing device, etc.

The electronic device 800 is illustrative and may take other forms. For example, an alternative implementation of the electronic device 800 may have fewer components, more components, or components that are in a configuration that differs from the configuration of FIG. 8. The components of FIG. 8 and/or other Figures described herein may be implemented using hardware based logic, software based logic and/or logic that is a combination of hardware and software based logic (e.g., hybrid logic); therefore, components illustrated in FIG. 6 and/or other Figures are not limited to a specific type of logic.

The processor 802 may include hardware based logic or a combination of hardware based logic and software to execute instructions on behalf of the electronic device 800. The processor 802 may include logic that may interpret, execute, and/or otherwise process information contained in, for example, the memory 804. The information may include computer-executable instructions and/or data that may implement one or more embodiments of the invention. The processor 802 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 803. Moreover, the processor 802 may include a system-on-chip (SoC) or system-in-package (SiP). An example of a processor 802 is the Intel® Core™ series of processors available from Intel Corporation, Santa Clara, Calif.

The electronic device 800 may include one or more tangible non-transitory computer-readable storage media for storing one or more computer-executable instructions or software that may implement one or more embodiments of the invention. The non-transitory computer-readable storage media may be, for example, the memory 804 or the storage 818. The memory 804 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

One or more computing devices 800 may include a virtual machine (VM) 804 for executing the instructions loaded in the memory 804. A virtual machine 806 may be provided to handle a process running on multiple processors so that the process may appear to be using only one computing resource rather than multiple computing resources. Virtualization may be employed in the electronic device 800 so that infrastructure and resources in the electronic device may be shared dynamically. Multiple VMs 806 may be resident on a single computing device 800.

A hardware accelerator 808 may be implemented in an ASIC, FPGA, or some other device. The hardware accelerator 808 may be used to reduce the general processing time of the electronic device 800.

The electronic device 800 may include a network interface 810 to interface to a Local Area Network (LAN), Wide Area Network (WAN) or the Internet through a variety of connections including, but not limited to, standard telephone lines, LAN or WAN links (e.g., T1, T3, 56kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 708 may include a built-in network adapter, network interface card, personal computer memory card international association (PCMCIA) network card, card bus network adapter, wireless network adapter, universal serial bus (USB) network adapter, modem or any other device suitable for interfacing the electronic device 800 to any type of network capable of communication and performing the operations described herein.

The electronic device 800 may include one or more input devices 812, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 800 may include other suitable I/O peripherals.

The input devices 812 may allow a user to provide input that is registered on a visual display device 814. A graphical user interface (GUI) 816 may be shown on the display device 814.

A storage device 818 may also be associated with the computer 800. The storage device 818 may be accessible to the processor 802 via an I/O bus. The information in the storage device 818 may be executed, interpreted, manipulated, and/or otherwise processed by the processor 802. The storage device 818 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 818 may store any modules, outputs, displays, files 820, information, user interfaces, etc, provided in example embodiments. The storage device 818 may store applications 822 for use by the computing device 800 or another electronic device. The applications 822 may include programs, modules, or software components that allow the computing device 1300 to perform tasks. Examples of applications include word processing software, shells, Internet browsers, productivity suites, and programming software. The storage device 818 may store additional applications for providing additional functionality, as well as data for use by the computing device 800 or another device. The data may include files, variables, parameters, images, text, and other forms of data.

The storage device 818 may further store an operating system (OS) 824 for running the computing device 800. Examples of OS 824 may include the Microsoft° Windows° operating systems, the Unix and Linux operating systems, the MacOS° for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

In one embodiment, the computing device 800 may include a feature-based modeling environment 830 for constructing models. The modeling environment 830 may be, for example, a software component or a computer program. The modeling environment 830 may be a CAD environment. The modeling environment 830 may include means for constructing, editing, saving and loading models 110, simulating the performance of a model 110, and providing the model 110 as an input to a rapid prototyping or manufacturing unit. The modeling environment 830 may further include a geometry kernel 832, which calculates and represents the geometry of features in the model.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more embodiments of the invention may be implemented in a programming language. Some examples of languages that may be used include, but are not limited to, Python, C, C++, C#, SystemC, Java, Javascript, a hardware description language (HDL), unified modeling language (UML), and Programmable Logic Controller (PLC) languages. Further, one or more embodiments of the invention may be implemented in a hardware description language or other language that may allow prescribing computation. One or more embodiments of the invention may be stored on or in one or more mediums as object code. Instructions that may implement one or more embodiments of the invention may be executed by one or more processors. Portions of the invention may be in instructions that execute on one or more hardware components other than a processor.

It is understood that the present invention may be implemented in a distributed or networked environment. For example, models may be provided and manipulated at a central server, while a user interacts with the models through a user terminal.

Figure 9:
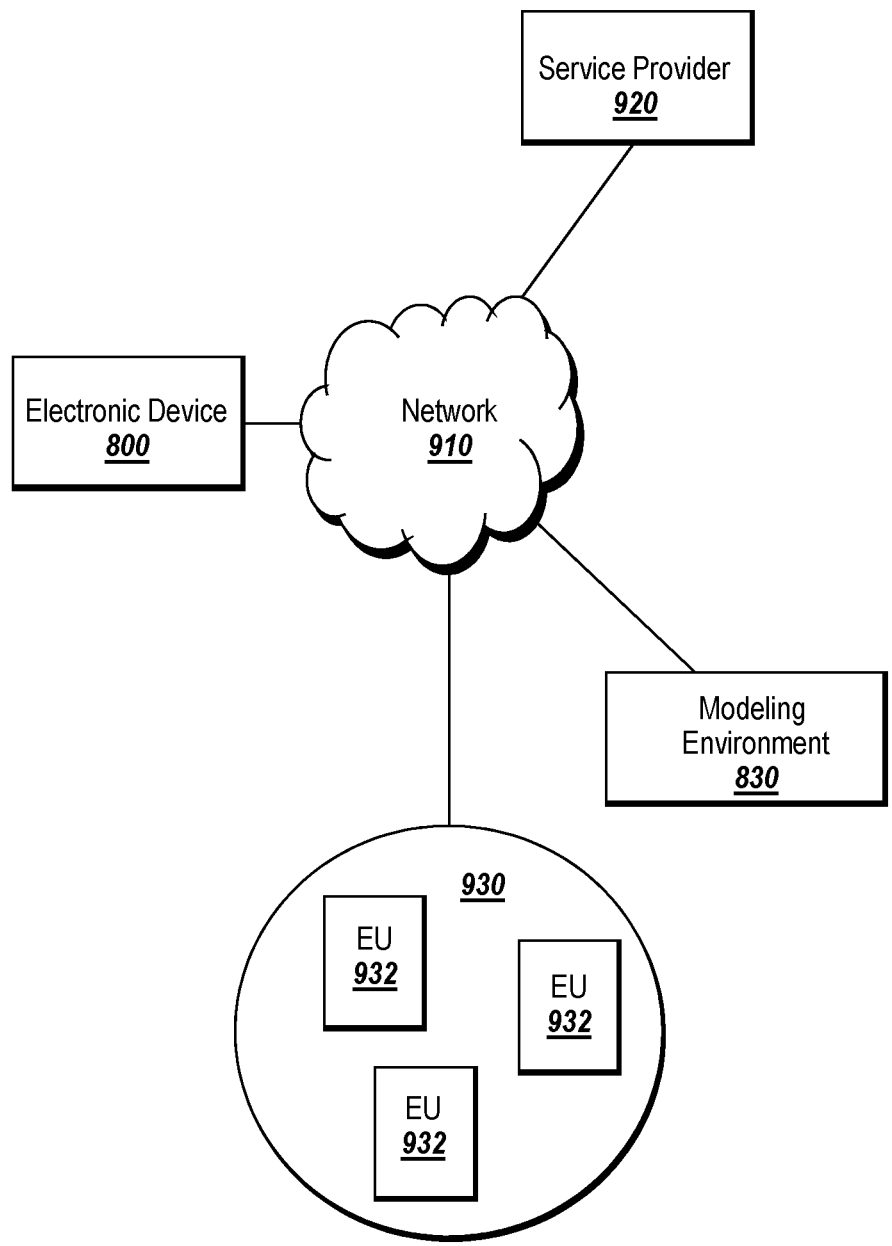
FIG. 9 depicts an example network implementation suitable for use with example embodiments described herein.

FIG. 9 depicts a network implementation that may implement one or more embodiments of the invention. A system 900 may include a computing device 800, a network 910, a service provider 920, a modeling environment 830, and a cluster 930. The embodiment of FIG. 9 is exemplary, and other embodiments can include more devices, fewer devices, or devices in arrangements that differ from the arrangement of FIG. 9.

The network 910 may transport data from a source to a destination. Embodiments of the network 910 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the computing device 800, the service provider 920, etc.). Data may include digital information or analog information. Data may further be packetized and/or non-packetized.

The network 910 may be a hardwired network using wired conductors and/or optical fibers and/or may be a wireless network using free-space optical, radio frequency (RF), and/or acoustic transmission paths. In one implementation, the network 910 may be a substantially open public network, such as the Internet. In another implementation, the network 910 may be a more restricted network, such as a corporate virtual network. The network 910 may include Internet, intranet, Local Area Network (LAN), Wide Area Network (WAN), Metropolitan Area Network (MAN), wireless network (e.g., using IEEE 802.11), or other type of network The network 910 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 920 may include a device that makes a service available to another device. For example, the service provider 920 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The modeling environment 830 may include a device that receives information over the network 910. For example, the modeling environment 830 may be hosted on a device that receives user input from the electronic device 800.

The cluster 930 may include a number of Execution Units (EU) 932, and may perform processing on behalf of the electronic device 800 and/or another device, such as the service provider 920. For example, the cluster 930 may perform parallel processing on an operation received from the electronic device 800. The cluster 930 may include EUs 932 that reside on a single device or chip or that reside on a number of devices or chips.

The EUs 930 may include processing devices that perform operations on behalf of a device, such as a requesting device. An EU may be a microprocessor, field programmable gate array (FPGA), and/or another type of processing device. The EU 932 may include code, such as code for an operating environment. For example, an EU may run a portion of an operating environment that pertains to parallel processing activities. The service provider 920 may operate the cluster 930 and may provide interactive optimization capabilities to the electronic device 800 on a subscription basis (e.g., via a web service).

EUs may provide remote/distributed processing capabilities for products such as the modeling environment 830 of FIG. 8. A hardware EU may include a device (e.g., a hardware resource) that may perform and/or participate in parallel programming activities. For example, a hardware EU may perform and/or participate in parallel programming activities in response to a request and/or a task it has received (e.g., received directly or via a proxy). A hardware EU may perform and/or participate in substantially any type of parallel programming (e.g., task, data, stream processing, etc.) using one or more devices. For example, a hardware EU may include a single processing device that includes multiple cores or a number of processors. A hardware EU may also be a programmable device, such as a field programmable gate array (FPGA), an application specific integrated circuit (ASIC), a digital signal processor (DSP), or other programmable device. Devices used in a hardware EU may be arranged in many different configurations (or topologies), such as a grid, ring, star, or other configuration. A hardware EU may support one or more threads (or processes) when performing processing operations.

A software EU may include a software resource (e.g., a technical computing environment) that may perform and/or participate in one or more parallel programming activities. A software EU may perform and/or participate in one or more parallel programming activities in response to a receipt of a program and/or one or more portions of the program. A software EU may perform and/or participate in different types of parallel programming using one or more hardware units of execution. A software EU may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (sometimes referred to as pipeline parallel programming). Stream parallel programming may use a number of software units of execution arranged, for example, in series (e.g., a line) where a first software Execution Unit may produce a first result that may be fed to a second software Execution Unit that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel. Further, although features and accessing classes have been described above using particular syntaxes, features and accessing classes may equally be specified using in different ways and using different syntaxes.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the Figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of a electronic device, unless otherwise stated.

It is intended that the invention not be limited to the particular embodiments disclosed above, but that the invention will include any and all particular embodiments and equivalents falling within the scope of the following appended claims.

The invention claimed is:

1. A method performed by a computer system having at least one processor and a memory, the method comprising:
 receiving a user request to revert an active computer-aided design (CAD) model comprising a plurality of components stored in the memory to a previously saved selected checkpoint, wherein the previously saved selected checkpoint comprises a reference to a prior checkpoint;
 identifying a set of changed components that were changed in the previously saved selected checkpoint relative to the prior checkpoint;
 comparing the set of changed components to the plurality of components of the active CAD model; and
 based on the comparing, reverting the active CAD model to the previously saved selected checkpoint by at least:
  for each of at least one component in the active CAD model:
   determining that the each component does not match a corresponding component in the set of changed components; and
   replacing the each component in the active CAD model with the corresponding component in the set of changed components; and
  for each of at least one component in the active CAD model:
   determining that the each component does match a corresponding component in the set of changed components; and
   retaining the each component in the active CAD model.

2. The method of claim 1, wherein the previously saved selected checkpoint is on a different branch of a checkpoint tree than the active CAD model.

3. The method of claim 1, wherein the previously saved selected checkpoint is on a same branch of a checkpoint tree as the active CAD model.

4. The method of claim 1, wherein the comparing comprises determining if a version of a component in the set of changed components matches a version of the component in the active CAD model.

5. The method of claim 4, wherein the reference to the prior checkpoint is an indirect reference comprising two or more intermediate references linking one or more intermediate checkpoints between the previously saved selected checkpoint and the prior checkpoint.

6. The method of claim 5, wherein the identifying a set of changed components that were changed in the previously saved selected checkpoint relative to the prior checkpoint comprises:
 adding changed components for each of the previously saved selected checkpoint and the one or more intermediate checkpoints to the set of changed components, wherein only a most recent version of any changed component is retained in the set of changed components.

7. The method of claim 1, further comprising:
 logging a set of components of the CAD model that have changed since activation of a currently-active checkpoint;
 receiving a user request to save a current state of the CAD model as a new checkpoint;
 saving the new checkpoint, wherein the new checkpoint comprises:
  a reference to the currently-active checkpoint, and
  an identification of the set of components of the CAD model that have changed since activation of the currently-active checkpoint.

8. A computer system comprising the at least one processor and the memory, wherein the memory has instructions stored thereon that are executed by the at least one processor and cause the computer system to perform the method of claim 1.

9. A non-transitory computer readable medium having instructions stored thereon, wherein the instructions are executed by the least one processor and cause the at least one processor to perform the method of claim 1.

10. A method performed by a computer system having at least one processor and a memory, the method comprising:
providing an active computer-aided design (CAD) model comprising a plurality of components stored in the memory;
logging a set of changed components of the CAD model that have changed since activation of a currently-active checkpoint;
receiving a user request to save a current state of the CAD model as a new checkpoint; and
saving the new checkpoint, wherein the new checkpoint comprises:
a reference to the currently-active checkpoint, and
an identification of the set of changed components.

11. The method of claim 10, further comprising:
in association with saving the new checkpoint, activating the new checkpoint as a new currently-active checkpoint;
subsequent to activating the new checkpoint as the new currently-active checkpoint, implementing changes to the active CAD model in response to user input;
subsequent to implementing changes to the active CAD model in response to user input, receiving a user request to revert the active CAD model to the new checkpoint;
comparing the set of changed components to the plurality of components of the active CAD model; and
based on the comparing, reverting the active CAD model to the new checkpoint by at least:
for each of at least one component in the active CAD model:
determining that the each component does not match a corresponding component in the set of changed components; and
replacing the each component in the active CAD model with the corresponding component in the set of changed components; and
for each of at least one component in the active CAD model:
determining that the each component does match a corresponding component in the set of changed components; and
retaining the each component in the active CAD model.

12. The method of claim 11, wherein another checkpoint has been activated after activating the new checkpoint and before receiving the user request to revert the active CAD model to the new checkpoint, and wherein the new checkpoint is on a different branch of a checkpoint tree than the active CAD model.

13. The method of claim 11, wherein the new checkpoint is on a same branch of a checkpoint tree as the active CAD model.

14. The method of claim 11, wherein the comparing comprises determining if a version of a component in the set of changed components matches a version of the component in the active CAD model.

15. A computer system comprising the at least one processor and the memory, wherein the memory has instructions stored thereon that are executed by the at least one processor and cause the computer system to perform the method of claim 10.

16. A non-transitory computer readable medium having instructions stored thereon, wherein the instructions are executed by the least one processor and cause the at least one processor to perform the method of claim 10.

17. The method of claim 10, further comprising:
in association with saving the new checkpoint, activating the new checkpoint as a new currently-active checkpoint;
subsequent to activating the new checkpoint as the new currently-active checkpoint, implementing changes to the active CAD model in response to user input;
subsequent to implementing changes to the active CAD model in response to user input, receiving a user request to revert the active CAD model to the new checkpoint;
comparing the set of changed components to the plurality of components of the active CAD model; and
based on the comparing, reverting the active CAD model to the new checkpoint by at least:
for each of at least one component in the active CAD model:
determining that the each component does not match a corresponding component in the set of changed components.

18. The method of claim 17, wherein another checkpoint has been activated after activating the new checkpoint and before receiving the user request to revert the active CAD model to the new checkpoint, and wherein the new checkpoint is on a different branch of a checkpoint tree than the active CAD model.

19. The method of claim 10, further comprising:
in association with saving the new checkpoint, activating the new checkpoint as a new currently-active checkpoint;
subsequent to activating the new checkpoint as the new currently-active checkpoint, implementing changes to the active CAD model in response to user input;
subsequent to implementing changes to the active CAD model in response to user input, receiving a user request to revert the active CAD model to the new checkpoint;
comparing the set of changed components to the plurality of components of the active CAD model; and
based on the comparing, reverting the active CAD model to the new checkpoint by at least:
for each of at least one component in the active CAD model:
determining that the each component does match a corresponding component in the set of changed components; and
retaining the each component in the active CAD model.

20. The method of claim 19, wherein another checkpoint has been activated after activating the new checkpoint and before receiving the user request to revert the active CAD model to the new checkpoint, and wherein the new checkpoint is on a different branch of a checkpoint tree than the active CAD model.

* * * * *